US009129652B1

(12) United States Patent
Pantel

(10) Patent No.: US 9,129,652 B1
(45) Date of Patent: Sep. 8, 2015

(54) METHOD FOR EFFICIENT WRITE OPERATIONS ON A DATA CARRIER WITH OVERLAPPING DATA TRACKS AND DEVICE THEREOF

(71) Applicant: Lothar Pantel, Neckargemuend (DE)

(72) Inventor: Lothar Pantel, Neckargemuend (DE)

(73) Assignee: inodyn NewMedia GmbH, Neckargemuend (DE)

( * ) Notice: Subject to any disclaimer, the term of this patent is extended or adjusted under 35 U.S.C. 154(b) by 0 days.

(21) Appl. No.: 14/635,965

(22) Filed: Mar. 2, 2015

(30) Foreign Application Priority Data

Mar. 4, 2014 (DE) .......................... 10 2014 003 205

(51) Int. Cl.
*G11B 5/09* (2006.01)
*G11B 20/12* (2006.01)
*G06F 3/06* (2006.01)
*G06F 12/10* (2006.01)

(52) U.S. Cl.
CPC ............ *G11B 20/1252* (2013.01); *G06F 3/064* (2013.01); *G06F 3/0619* (2013.01); *G06F 3/0676* (2013.01); *G06F 12/10* (2013.01); G06F 2003/0692 (2013.01); G06F 2212/1032 (2013.01); G06F 2212/152 (2013.01); G06F 2212/21 (2013.01); G06F 2212/657 (2013.01); G06F 2212/70 (2013.01); G11B 2020/1238 (2013.01)

(58) Field of Classification Search
CPC ........... G11B 27/3027; G11B 2220/20; G11B 2220/1238; G11B 5/59655; G11B 2220/90; G11B 5/012; G11B 5/5547; G11B 5/59633
USPC ........... 360/78.04, 60, 48, 49, 78.14; 711/712
See application file for complete search history.

(56) References Cited

U.S. PATENT DOCUMENTS

| 7,443,625 B2 | 10/2008 | Hamaguchi et al. |
| 8,223,458 B2 | 7/2012 | Mochizuki et al. |
| 8,363,349 B2 * | 1/2013 | Haga et al. ................. 360/78.04 |
| 8,432,633 B2 | 4/2013 | Grobis et al. |
| 8,699,185 B1 | 4/2014 | Teh et al. |
| 2007/0174582 A1 | 7/2007 | Feldman |
| 2007/0183071 A1 | 8/2007 | Uemura et al. |
| 2012/0233432 A1 | 9/2012 | Feldman et al. |
| 2013/0170061 A1 | 7/2013 | Saito et al. |
| 2014/0006707 A1 | 1/2014 | Bandic et al. |

* cited by examiner

*Primary Examiner* — Nabil Hindi

(57) ABSTRACT

A method and a device for efficient write operations are disclosed, which may be used in connection with shingled magnetic recording (SMR) in order to reduce write amplification (read-modify-write). The tracks on at least one data carrier surface are grouped into bands, and the address space of logical block addresses is divided into address subsets. Each of these address subsets is permanently assigned to a dedicated selection of tracks derived from all bands. Depending on the embodiment, the dedicated selection of tracks may be chosen in such a way that no write amplification occurs in a first phase and/or that recent data or newly added data can be altered without necessitating read-modify-write.

21 Claims, 22 Drawing Sheets

| phys. Cyl.# c | logic Cyl. idx. i | Taken |
|---|---|---|
| 000 | | |
| 001 | 398 | 1 |
| 002 | 0 | 1 |
| 003 | 1 | 1 |
| 004 | 399 | 1 |
| 005 | | |
| 006 | 400 | 1 |
| 007 | 2 | 1 |
| 008 | 3 | 1 |
| 009 | 401 | 1 |
| 010 | | |
| 011 | 402 | 1 |
| 012 | 4 | 1 |
| 013 | 5 | 1 |
| 014 | 403 | 1 |
| 015 | | |
| ⋮ | ⋮ | |
| 990 | | |
| 991 | 794 | 1 |
| 992 | 396 | 1 |
| 993 | 397 | 1 |
| 994 | 795 | 1 |

*FIG. 11*

| phys. Cyl.# c | logic Cyl. idx. i | Taken |
|---|---|---|
| 000 | 0 | 1 |
| 001 | | 0 |
| 002 | | 0 |
| 003 | | 0 |
| 004 | | 0 |
| 005 | | |
| 006 | | 0 |
| 007 | | 0 |
| 008 | | 0 |
| 009 | | 0 |
| 010 | 1 | 1 |
| ⋮ | ⋮ | |
| 979 | 178 | 1 |
| 980 | | 0 |
| 981 | | 0 |
| 982 | | 0 |
| 983 | | 0 |
| 984 | | |
| 985 | | 0 |
| 986 | | 0 |
| 987 | | 0 |
| 988 | | 0 |
| 989 | 179 | 1 |

*FIG. 15*

METHOD FOR EFFICIENT WRITE OPERATIONS ON A DATA CARRIER WITH OVERLAPPING DATA TRACKS AND DEVICE THEREOF

CROSS-REFERENCE TO RELATED APPLICATION

This application claims priority from German Patent Application DE 10 2014 003 205.1, filed Mar. 4, 2014, the entire disclosure of which is expressly incorporated herein by reference.

TECHNICAL FIELD

The present invention relates to the field of data storage and, in particular, to efficient write operations in conjunction with storage devices having overlapping data tracks, such as a hard disk drive, operating according to the shingled magnetic recording (SMR) methodology.

BACKGROUND OF THE INVENTION

Common hard disk drives are storage devices comprising disks whose data-carrying surfaces are coated with a magnetic layer. Typically, the disks are positioned atop one another on a disk stack (platters) and rotate around an axis, or spindle. To store data, each disk surface is organized in a plurality of circular, concentric tracks. Groups of concentric tracks placed atop each other in the disk stack are called cylinders. Read/write heads, each containing a read element and a write element, are mounted on an actuator arm and are moved over the spinning disks to a selected track, where the data transfer occurs. The actuator arm is controlled by a hard disk controller, an internal logic responsible for read and write access. A hard disk drive can perform random read and write operations, meaning that small amounts of data are read and written at distributed locations on the various disk surfaces.

Each track on a disk surface is divided into sections, or segments, known as physical sectors. A physical sector, also referred to as a data block or sector data, typically stores a data unit of 512 bytes or 4 KB of user data.

A disk surface may be divided into zones. Zones are regions wherein each track comprises the same number of physical sectors. From the outside inward, the number of physical sectors per track may decrease from zone to zone. This approach is known as zone bit recording.

A computer, or host, accessing a hard disk drive may use logical block addresses (LBAs) in commands to read and write sector data without regard for the actual locations of the physical sectors on the disc surfaces. By means of a hard disk controller the logical block addresses (LBAs) can be mapped to physical block addresses (PBAs) representing the physical locations of sector data. Different mapping techniques for an indirect LBA-to-PBA read and write access are known in the prior art. In some embodiments LBA-to-PBA mapping does not change often. In other embodiments the LBA-to-PBA mapping may change with every write operation, the physical sectors being assigned dynamically.

The storage capacity of a hard disk drive can be increased, inter alia, by reducing the track pitch (i.e., track width) of the concentric tracks on the disk surfaces. This requires a decrease in the size of the read and write elements. However, without new storage technologies, a reduction in the size of the write elements is questionable, as the magnetic field that can be generated is otherwise too small to adequately magnetize the individual bits on the disk surface. A known solution is the shingled magnetic recording methodology, by which a write element writes data tracks in an overlapping fashion. Further information pertaining to shingled magnetic recording (SMR) can be found in patents U.S. Pat. No. 8,223,458 B2 and U.S. Pat. No. 8,432,633 B2, as well as in patent applications US2013/0170061 A1, US2007/0183071 A1 and US2012/0233432 A1.

With SMR, overlapping data tracks are grouped into bands, which are separated by inter-band gaps, also known as "guard bands," "guard regions," or "guard tracks." Typically, to change the contents of a first track in an already populated band, it is necessary to read out and buffer all subsequent tracks of the band because after updating the data on that first track, rewriting the buffered data up to the next guard region is unavoidable as the wide write element will inevitably overwrite the data of each subsequent track. Due to the sequential and overlapping structure of SMR, even a small change to the contents stored in a band can result in a significant increase in the amount of data that must be read and written, thus leading to significant delays. Such a process is referred to as "read-modify-write" or "write amplification."

Workloads such as databases often generate random write operations characterized by ongoing updates of small data blocks. These are the most expensive operations within an SMR storage system due to their significant write amplification, which negatively impacts performance. Moreover, increasing file and data fragmentation can slow an SMR hard disk drive much more than it can a conventional hard-disk drive. For these reasons, SMR hard disk drives are primarily intended for cold-storage applications, that is, for scenarios in which data are rarely altered. In the prior art SMR hard disk drives are deemed unsuitable as equal, universal substitutes for conventional hard disk drives.

Known solutions for reducing write-amplification have their disadvantages. One option is to buffer the data of incoming write commands and write the data in larger, contiguous blocks at a later stage. This only works as long as the average data throughput of the collected random write operations is sufficiently low. If the required data throughput is permanently too high for the low write performance of an SMR hard disk drive, even a large buffer will run over, leading to a drastic drop in performance. Furthermore, depending on the design, an additional and/or larger buffer, e.g., flash memory, can increase the production costs of an SMR hard disk drive.

Other known approaches for reducing write amplification include garbage collection, as is also used in solid state disks (SSDs). In contrast to conventional hard disk drives, the association between logical block addresses (LBAs) and physical block addresses (PBAs) is entirely mutable. A translation layer provides a link between LBAs and PBAs. The garbage collection may perform an internal "scrubbing" or other housekeeping tasks from time to time, and this typically requires data be moved internally using read and write operations. The effective performance, or retrievable transfer rate, of the SMR hard disk drive can, therefore, vary.

Patent U.S. Pat. No. 7,443,625 B2, entitled "Magnetic disk drive," describes a process that uses a "shift address table." This method requires an internal "scrubbing" at regular intervals, i.e., phases during which the table is "cleaned up."

Patent application US2007/0174582 A1, entitled "Mutable association of a set of logical block addresses to a band of physical storage blocks," describes how to reduce write amplification by means of mutable mapping between "logical blocks (LBAs)" and "physical blocks (e.g., sectors) in the physical space" (paragraph [0065]). The approach is based on the assumption that a mutable association is essential to reducing write amplification. E.g., "the management scheme is preferably configured to identify suitable locations where writes can take place quickly" (paragraph [0101]). During regular operation stored data are moved to a different physical location, "thereby changing the LBA-physical sector association" (paragraph [0009]). Patent application US2007/0174582 A1 does not disclose an immutable, i.e., unchanging association between LBAs and physical sectors and, hence, does not anticipate the invention presented hereinafter. In concrete terms, US2007/0174582 A1 does not teach how to reduce the write amplification of an SMR hard disk drive operating with immutable LBA-to-PBA mapping.

The method disclosed in US2007/0174582 A1 requires a map "to track the allocation or association status of each sector" (paragraph [0010]). That is, in contrast to an immutable association between LBAs and physical sectors, "a table is maintained and updated to show which physical sectors are now allocated to store such LBAs" (paragraph [0057]). The required map or table reduces the effective usable capacity of the hard disk drive.

Furthermore, in contrast to an immutable LBA-to-PBA mapping, the approach disclosed in US2007/0174582 A1 requires internal garbage collection, that is, "realignment activities that can take place from time to time in the background to maintain the band in an optimal state for the receipt of additional data" (paragraph [0059]). As with solid state disks (SSDs) such an internal garbage collection is incompatible with the conventional disk defragmentation function of an operating or file system, since conventional defragmentation would be counterproductive for the internal garbage collection.

Another approach for reducing write amplification is a file system specially adapted to SMR. "Shingled Magnetic Recording for Big Data Applications" by Suresh, Gibson, and Ganger (CMU-PDL-12-105; Parallel Data Laboratory, Carnegie Mellon University, Pittsburgh, Pa.; May 2012) describes a file system named, "ShingledFS." The disadvantage of a dedicated SMR file system is, amongst other things, that the existing software must be updated. E.g., new drivers or a new version of the operating system (OS) might be required. This is associated with additional expense and additional risks, reducing the attractiveness of SMR hard disk drives due to the lack of complete compatibility in terms of a "drop-in replacement."

What is required, then, is a cost-effective method of operating SMR hard disk drives that does not entail any severe negative effects on performance yet is fully compatible with existing, conventional hard disk drives, in particular, immutable LBA-to-PBA association and full support for conventional disk-defragmentation functions.

SUMMARY OF THE INVENTION

Aspects of the present disclosure are directed to a storage device configured for overlapping data tracks, such as a SMR hard disk drive. According to the claims, the storage device operates with a substantially immutable, that is, mainly unchanging relation between a logical block address and an associated physical position on a track (e.g., a physical sector). The tracks on at least one data carrier surface (e.g., disk surface) are grouped into bands, and the address space of logical block addresses is divided into address subsets. Each of these address subsets is permanently assigned to a dedicated selection of tracks derived from all bands.

Depending on the embodiment and objective, a first address subset may be assigned to a dedicated selection of tracks that are far enough apart so that the wide data tracks of a write element do not overlap. (Guard regions may be an exception.) As a result, when filling the storage device during a "first phase," associated with the first address subset, no read-modify-write operations are required, even in cases of random write operations, since the dedicated selection of tracks prevents that valid data on adjacent tracks is overwritten by the wide write element.

In other embodiments, the dedicated selection of tracks within the bands is chosen in such a way, that recent data or newly added data, stored on the storage device, can be altered without read-modify-write.

Still other embodiments may use symmetrical bands comprising data tracks that overlap in opposite radial directions. A common guard region may be located in the middle of the band (or at a location near the middle), which is used by the wide write element from both sides. Alternatively, the overlapping data tracks may diverge in the middle of the band (or at a location near the middle), wherein adjacent symmetrical bands share a common guard region. Symmetrical bands may thereby reduce write amplification, as the number of tracks that must be updated via read-modify-write typically is at least halved.

The aforementioned and many further aspects, variants, objectives, and advantages of the invention will be comprehensible to those skilled in the art after reading detailed descriptions of the embodiments.

BRIEF DESCRIPTION OF THE DRAWINGS

Further features, advantages, and potential applications will be apparent from the drawings. All described and/or illustrated features, alone or in any combination, independent of the synopsis in individual claims, constitute the subject matter of the invention.

FIG. 11 shows symmetrical bands whose guard regions are located at the band boundaries. (second embodiment)

FIG. 15 shows the end of a "first phase," 20% of disk capacity is used. (fourth embodiment)

DETAILED DESCRIPTION OF THE INVENTION

Figure 1:
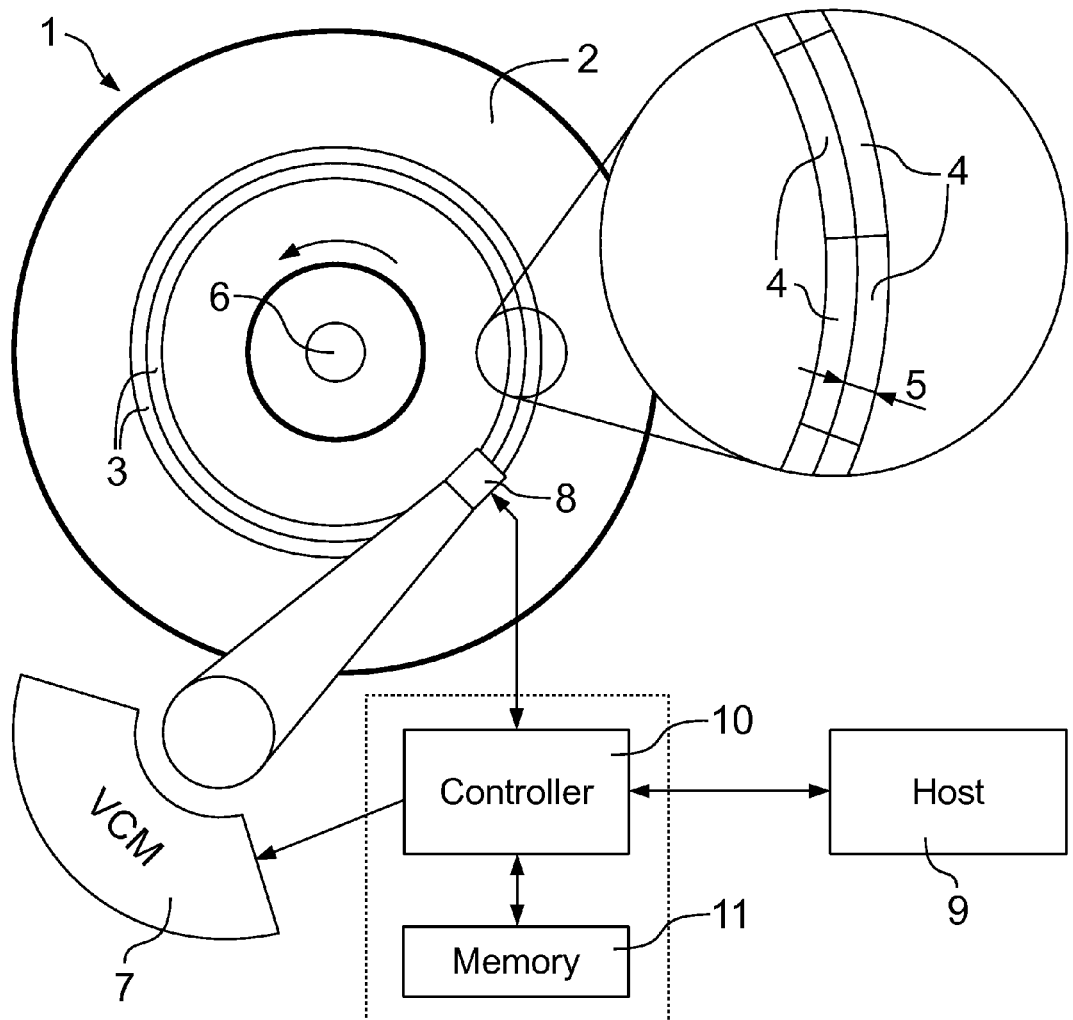
FIG. 1 shows a hard disk drive.

FIG. 1 shows a SMR hard disk drive 1 as an example of a storage device. The disks, with magnetic layers on their disk surfaces 2, spin around the rotational axis of the spindle 6, upon which the individual disks are mounted. Tracks 3 on the disk surfaces 2 are divided into sections, or segments, referred to herein as physical sectors 4, or sectors 4.

To perform read and write operations, the read/write heads 8 are shifted by an actuator arm to the desired track 3. The actuator arm is moved by an actuator 7, typically a voice coil motor (VCM). The actuator 7 is controlled by a hard disk controller 10. The hard disk controller 10 communicates with a host system 9 and has access to a memory, or cache 11. The memory, or cache 11 may, inter alia, buffer data of tracks 3 or sectors 4.

Figure 2:
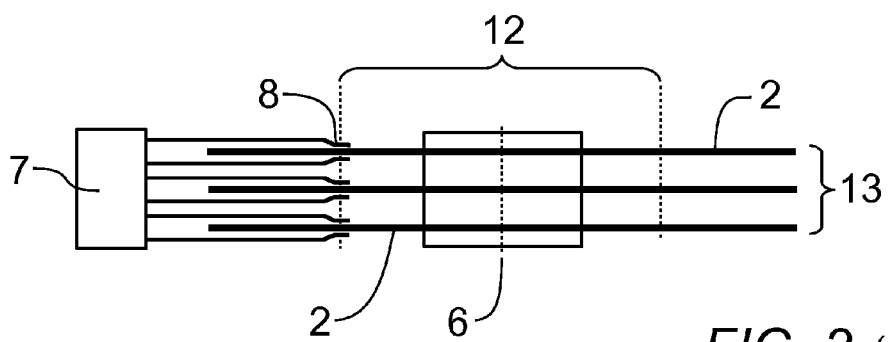
FIG. 2 illustrates the disk stack of the hard disk drive in profile.

FIG. 2 shows a side view of a disk stack 13 (platters), which in this example, comprises three disks, or six disk surfaces 2, as each disk, having upper and lower sides, has two magnetic layers. Cylinder 12 encompasses all concentric tracks 3 that are atop each other in the disk stack 13.

For shingled magnetic recording, the tracks 3 on the disk surfaces 2 are grouped in bands 15. This is demonstrated in FIG. 3, which shows an enlarged, sectional view of a conventional band 15, comprising eight tracks 3. In the present disclosure, the tracks 3 are numbered by means of cylinder numbers according to the scheme "Cyl. #101," "Cyl. #102," "Cyl. #103," etc. The band 15, consisting of tracks 3 from cylinder #101 through cylinder #108, can be located at any suitable position on a disk surface 2.

The read/write head 8 comprises a write element 16 and a read element 17. In accordance with the principle of shingled magnetic recording, the width of the write element 16 exceeds the width of the read element 17 by an excess width 18. In the particular example, as per FIG. 3, the write element 16 is twice as wide as the read element 17. The arrow 19 indicates the relative direction of motion of the read/write head 8. The write element 16 writes overlapping data tracks 20, which are depicted with a pattern. For illustrative purposes, two different patterns are used to make the overlapping data tracks 20 more distinguishable. Moreover, in the drawings, the sectional view of the data tracks 20 is shown slightly offset along the writing direction 19 so that the overlapping structure is visible. Actual data tracks 20 continue in both directions along their respective tracks 3.

Typically, in order to fill a band 15 with data, the write element 16 starts at the track 3 on cylinder #101, that is, the wide write element 16 is positioned on cylinder pair (#101, #102). Next, to get overlapping data tracks 20, the write element 16 is positioned on cylinder pair (#102, #103), etc. By overlapping the data tracks 20, the resulting track width 5 is halved in this case.

Figure 3:
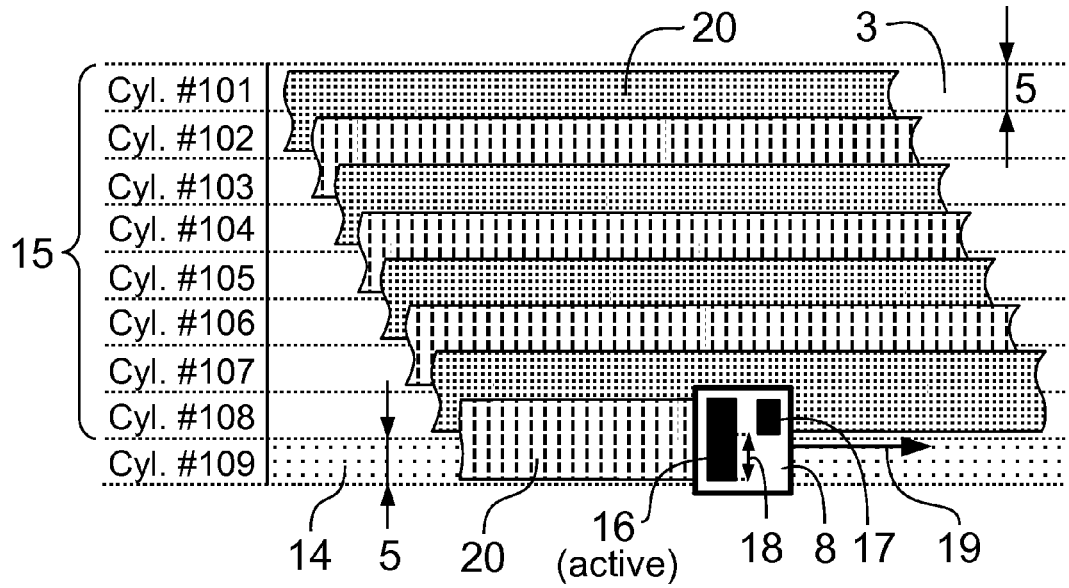
FIG. 3 is an illustration of a conventional band with overlapping data tracks.

Individual bands 15 are separated by inter-band gaps, referred to herein as guard regions 14. FIG. 3 shows a guard region 14 on cylinder #109, marked with a dot pattern. In the illustrated configuration, the guard region 14 occupies a single track 3, referred to herein as a guard track 14. In other embodiments, depending on the excess width 18 of the write element 16, the width of the guard region 14 may also be greater, for example, a multiple of the track width 5.

The guard track 14 is required to close off and delimit the band 15 so that the wide write element 16 does not overwrite any tracks 3 of a subsequent band 15. For instance, to write data on the track 3 of cylinder #108, as shown in FIG. 3, the wide write element 16 is positioned on cylinder pair (#108, #109).

Those skilled in the art will recognize that, if data on the first track 3 of the band 15 (cylinder #101) are to be altered or rewritten, the data on all subsequent tracks 3 up to the guard track 14 must first be read and buffered at a temporary location or in a memory or cache 11, and must finally be rewritten, as the contents of each subsequent track 3 will be destroyed during the writing process. This is referred to as read-modify-write or write amplification.

Figure 4:
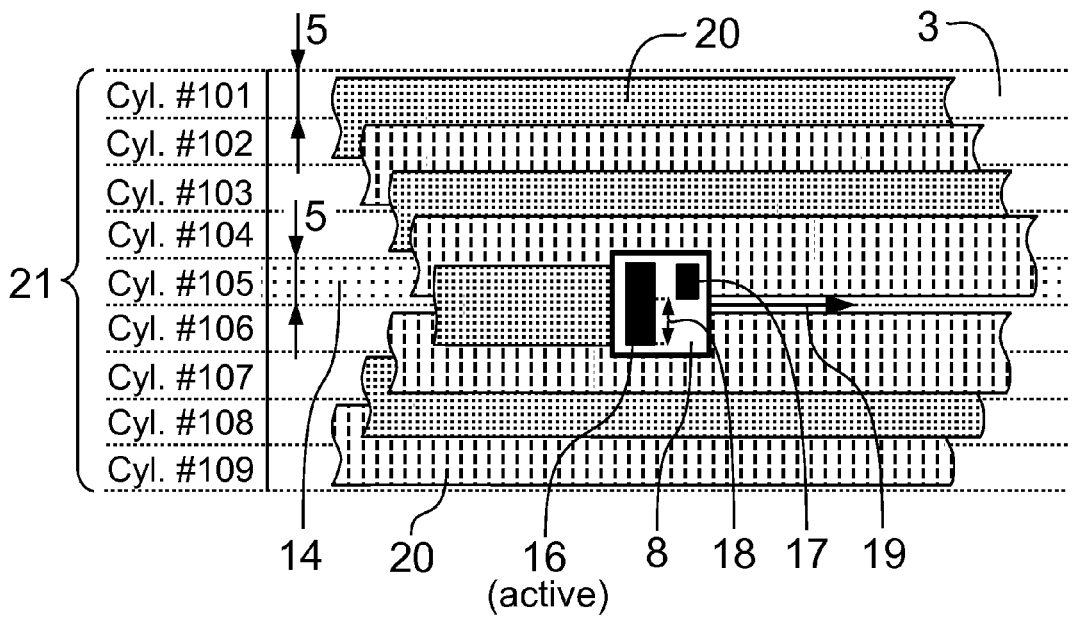
FIG. 4 shows a symmetrical band whose guard region is located in the middle of the band.

FIG. 4 shows a new type of band for shingled magnetic recording, referred to herein as a symmetrical band 21. A symmetrical band 21 differs from a conventional band 15 in the position of the guard region 14, which is located in or near the middle of the band 21. For structural reasons, the guard region 14 in this case is defined as an integral part of the band 21. A plurality of symmetrical bands 21 can be arranged side-by-side without necessitating an additional gap exist between the band boundaries.

In the specific example shown in FIG. 4 the read/write head 8 and the number of tracks 3 per band 21 correspond to the previous example of a conventional band 15, that is, the write element 16 writes data tracks 20 that are twice as wide as the underlying track width 5, and the band 21 contains eight tracks 3 that can be used to store data. However, in this case, the guard track 14 is located on cylinder #105 and, thus, in the middle of the band 21.

In the case of a symmetrical band 21, the overlapping data tracks 20 may be written on both sides of the band 21, from the outside inward. This results in overlaps in opposite radial directions, symmetrically to the guard region 14. In FIG. 4, the overlapping data tracks 20 show the order in which the individual tracks 3 in the band 21 may be written by the write element 16 to fill the band 21 with data. By way of example, the track 3 on cylinder #101 at the upper band boundary may be written first; next, the track 3 on cylinder #109 at the lower band boundary, then the track 3 on cylinder #102 in the upper half of the band 21, etc.

The excess width 18 of the write element 16 should always be positioned toward the center of the band 21 so that outer tracks 3 of the band 21, which may already contain valid data, are not overwritten. When writing data on the two innermost tracks 3 of the band 21 (Cyl. #104 and #106 as per FIG. 4), it is crucial that the write element 16 be positioned such that the excess width 18 is caught by the guard region 14 in both cases. In contrast to that of a conventional band 15 (as per FIG. 3), the guard region 14 of a symmetrical band 21 (as per FIG. 4) is used from both sides of the band 21, that is, the two innermost tracks 3 of the band 21 share a common guard region 14.

In this context, the term "excess width 18 of write element 16" is to be interpreted regardless of the position of the read element 17 within the read/write head 8 and regardless of the corresponding arrow 18 depicted in FIG. 4. E.g., the excess width 18 may be located on either sides of the write element 16, depending on whether the write element 16 writes to a track 3 in the upper or lower half of a band 21.

With continued reference to the situation depicted in FIG. 4, a data track 20 with valid data has been written to cylinder pair (#104, #105) by the wide write element 16. However, since the contents of the guard track 14 on cylinder #105 are irrelevant, the guard track 14 can be overwritten while writing new data on the lower adjacent track 3 on cylinder #106, that is, the write element 16 is positioned on cylinder pair (#105, #106), as shown in the drawing.

Compared with the conventional arrangement of tracks 3 in a band 15 (as per FIG. 3), the symmetrical arrangement (as per FIG. 4) reduces the maximum write amplification by more than half. E.g., if data are to be changed on the first track 3 (Cyl. #101) of the band 21, data of merely three additional tracks 3 need to be read and rewritten, rather than of seven additional tracks 3. This results in significantly reducing the time required to update data in a full band 21. The average transfer rate for random write operations is therefore increased.

Figure 5:
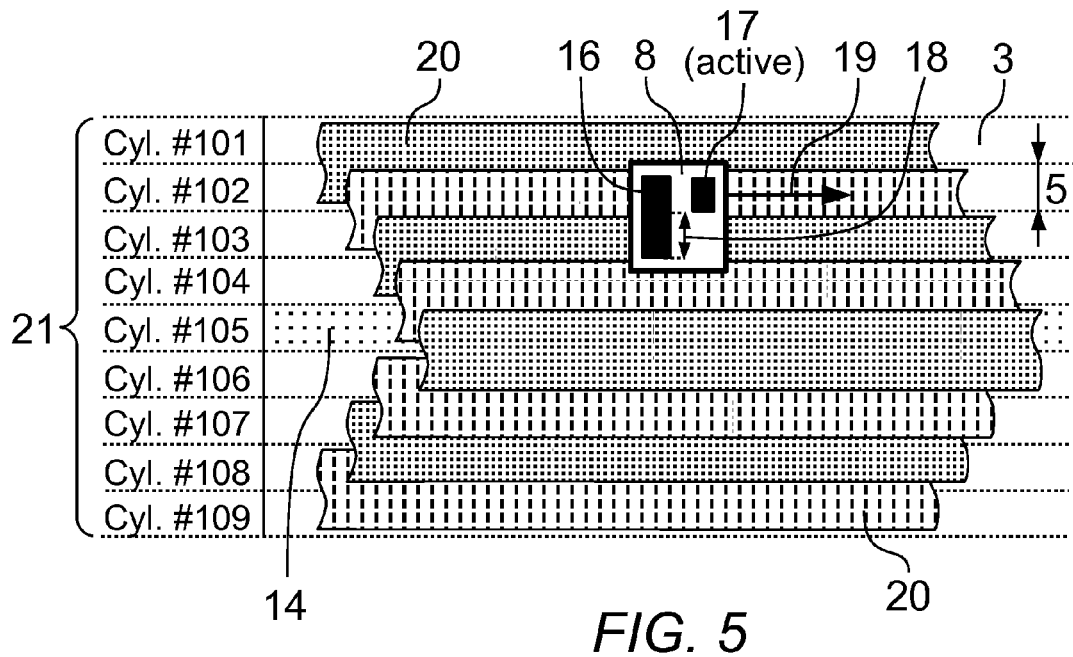
FIG. 5 illustrates how to read data from a track in the symmetrical band.

FIG. 5 shows by way of example how the track 3 on cylinder #102 can be read from a full symmetrical band 21. The read/write head 8 is positioned so that the active read element 17 is located on cylinder #102. The relative direction of motion of the read/write head 8 is indicated with an arrow 19. The read element 17 fits to the width of the tracks 3, i.e., the read element 17 is designed and optimized for the track width 5. This also applies to the effective width of the write element 16, which is designed to write data tracks 20 that are twice the track width 5.

Figure 6:
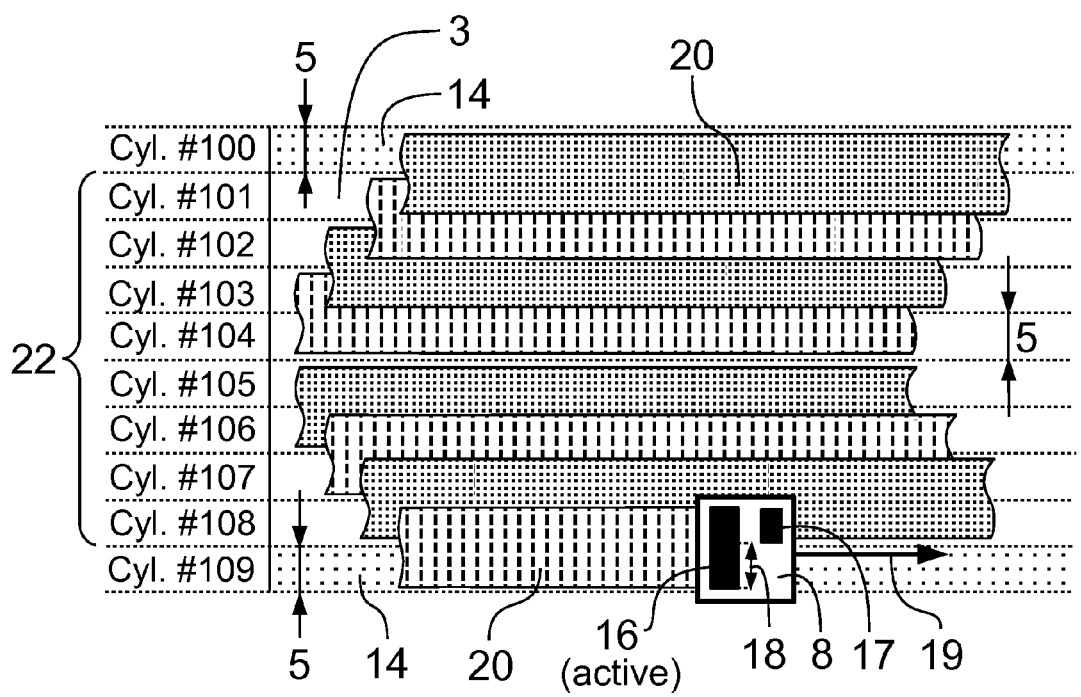
FIG. 6 shows a symmetrical band whose guard regions are located at the band boundaries.

The symmetrical overlaps of data tracks 20 within a band 21 may also be arranged in the opposite direction. In this case, the overlapping data tracks 20 may diverge in the middle of the band 22 or at a location near the middle, and the guard regions 14 may be located at the upper and lower band boundaries. This is illustrated in FIG. 6. Here, the overlapping data tracks 20 diverge between cylinders #104 and #105 and the guard tracks 14 are located at the band boundaries on cylinder #100 and #109. In this context, the guard regions or guard tracks 14 are defined as separate instances and are not embedded within the band 22, as each guard region or guard track 14 may also be used by an adjacent band 22.

To fill the band 22 with data, overlapping data tracks 20 may be written by the wide write element 16 on both sides of the symmetrical band 22 from the inside out. This may result in overlaps in opposite radial directions, symmetrical to the center of the band 22. By way of example, as per FIG. 6, the track 3 on cylinder #104 just above the middle of the band 22 may be written first; next, the track 3 on cylinder #105 just below the middle of the band 22, then the track 3 on cylinder #103 in the upper half of the band 22, etc. The excess width 18 of the write element 16 should always be positioned toward the outside of the band 22, that is, toward the guard regions 14, so that the inner tracks 3 of the band 22, which may already contain valid data, are not overwritten.

The definition of track width 5 in shingled magnetic recording, as used in the present disclosure, is based on the width of the remaining readable data track 20 after overlapping with an adjacent data track 20. This remaining readable data track 20 constitutes the track 3 for which the read element 17 is designed or optimized.

Physical sectors 4 are sections of a track 3. The terms "sector" and "track" are therefore closely related technically and, depending on the desired embodiment, often equally applicable. Commonly, the umbrella term "track" is also representative of a portion of the track 3 under consideration. Whenever a track 3 is mentioned in the present disclosure, it can also refer to a physical sector 4 that is situated on it. Conversely, if the term "physical sector" is mentioned, the relevant operation may alternatively be applied to the entire track 3, or larger parts of the track 3.

The terms "track" (or "track number") and "cylinder" (or "cylinder number") are likewise closely related technically. Whenever a process is said to take place on a track 3, this may also concern the associated cylinder 12. Conversely, if the term "cylinder" is mentioned, this may imply involvement of at least one of the tracks 3 on the specified cylinder 12.

If a track 3 or band 15, 21, 22, 42 is referred to as "preceding," "above," "upwards," or at an "upper" location, what is meant is that this track 3 or band 15, 21, 22, 42 may be located farther outside on the disk surface 2 and/or may have a smaller track or cylinder number. If a track 3 or band 15, 21, 22, 42 is "succeeding," "below," "downwards," or at a "lower" location, this track 3 or band 15, 21, 22, 42 may be located farther inside on the disk surface 2 and/or may have a greater track or cylinder number. Depending on the embodiment, a reverse orientation (e.g., farther inside instead of farther outside) or a numbering of the tracks 3 and cylinders 12 in the opposite direction may also apply.

In the present disclosure, the term "guard region" is used as an umbrella term for "guard track." A guard track is defined as a guard region consisting of one track 3. As a general term, a guard region may consist of just one track 3 or more than one track 3. Depending on the embodiment, a guard region or guard track may be defined as an integral part of a symmetrical band 21 or may be defined as a separate instance between two bands 15, 22, 42.

Figure 7:
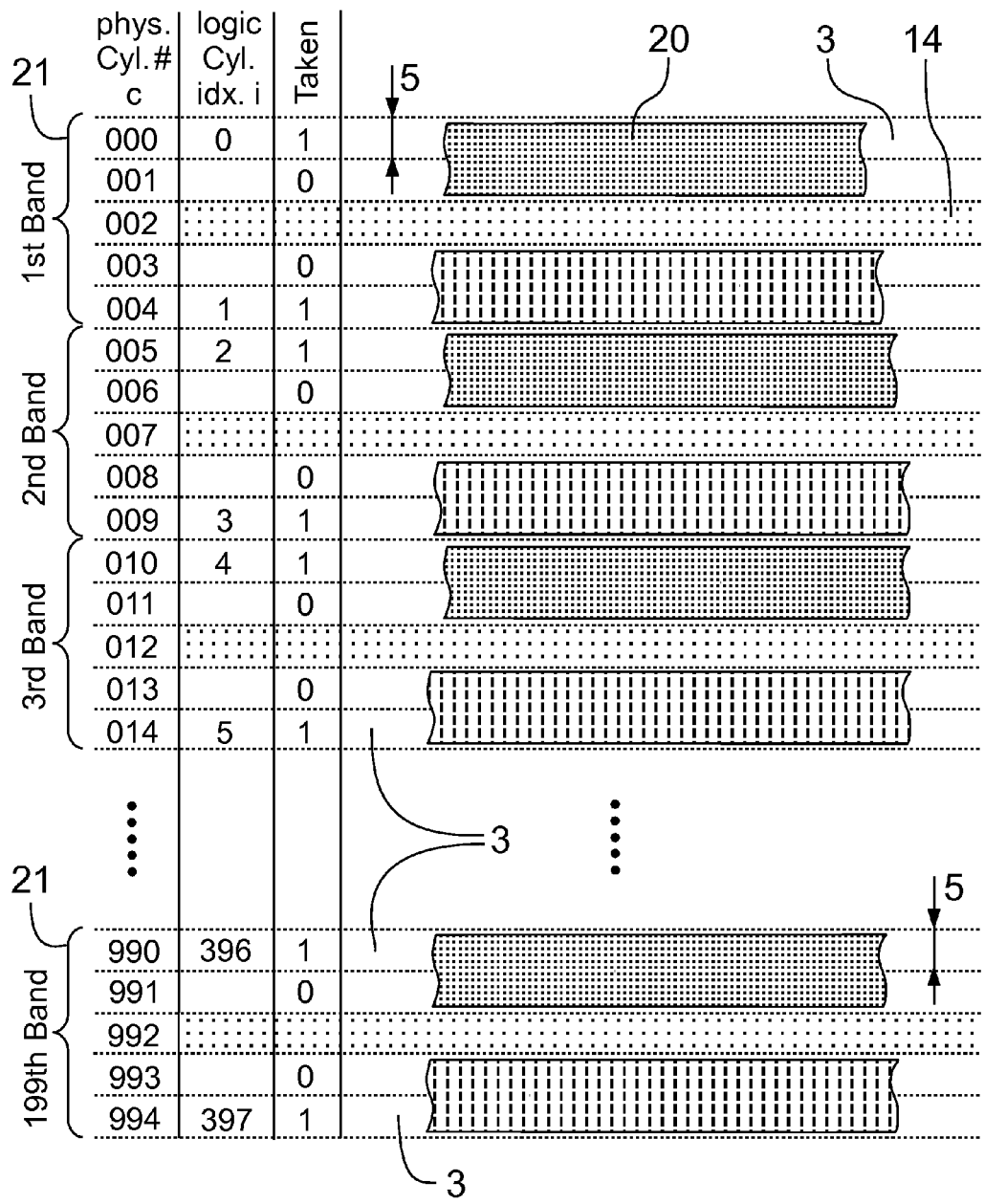
FIG. 7 shows the end of a "first phase," 50% of disk capacity is used. (first embodiment)
Figure 8:
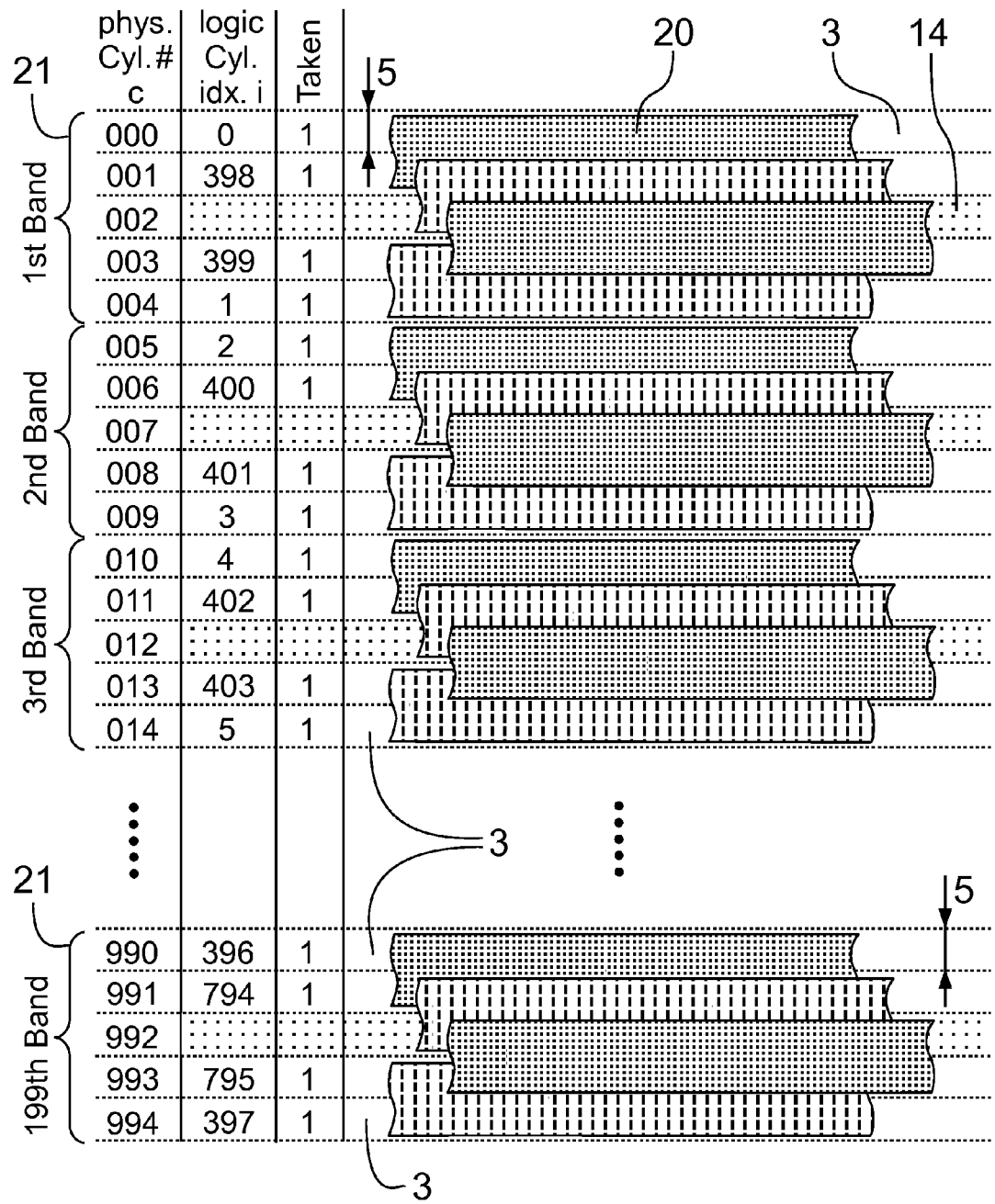
FIG. 8 shows the end of a "second phase," disk full. (first embodiment)

FIG. 7 through FIG. 10 show a first embodiment. As in the previous examples, a read/write head 8 is used whose write element 16 writes data tracks 20 that are twice as wide as the track width 5. Tracks 3 are grouped into symmetrical bands 21, each comprising four usable tracks 3 and one guard track 14 at the center. In this example a disk surface 2 incorporates 995 tracks, counted from cylinder #000 to cylinder #994, grouped into 199 bands, as shown in FIG. 7 and FIG. 8.

For the sake of clarity and to keep the drawings manageable, each disk surface 2 in this embodiment has a very low track count. It is to be expressly noted that actual embodiments may have much larger track counts. Furthermore, it is pointed out that some parts, regions, or sections of the disk surface 2 may be used or reserved for other purposes. It should also be noted that the drawings represent only one disk surface 2. Further disk surfaces 2, if any, may be filled in the same manner.

A host system 9, which accesses the SMR hard disk drive 1, may use logical block addresses (LBAs) in commands to read and write sector data without regard for the actual locations of the physical sectors 4 on the disc surfaces 2. LBAs may be mapped to physical block addresses (PBAs) representing the physical sectors 4, that is, the host system 9 may target a specific physical sector 4 using a sequential LBA number, starting with zero, and the conversion to the physical location (cylinder/head/sector) may be performed by the hard disk controller 10. In this process, the geometry of the SMR hard disk drive 1 must be taken into account, such as zones (zone bit recording) and the number of disc surfaces 2.

Different mapping techniques for such an indirect read and write access are known in the prior art. The first embodiment and further embodiments make use of an association between LBAs and physical sectors 4 that is substantially immutable, that is, mainly unchanging. (An exception may be a defective physical sector 4 or a defective track 3 on a disk surface 2, which usually requires that LBAs be remapped to a different physical location, e.g., to a spare sector area.)

Since the assignment of LBA numbers to specific physical locations, such as disk surfaces 2 or cylinder numbers, is not the primary subject of the present disclosure, such assignments are expressed by the following general function, where "a" is the LBA number of a physical sector 4 and "c" is the corresponding cylinder number.

$$c = g(a)$$

In the first and all subsequent embodiments, the result of g(a) is not used as a conventional cylinder number "c", but as logical cylinder index "i".

$$i = g(a)$$

Logical cylinder index "i" is an imagined, or virtual, cylinder number. The actual cylinder number "c" is calculated using a new index function f(i). The new index function f(i) reorganizes the order in which the tracks 3 are written by the write element 16, that is, the function f(i) is used to establish a novel order in which the read/write head 8 is moved over the disk surface 2. The result of index function f(i) is cylinder number "c", which reflects the actual physical position of the read/write head 8 on the disk surface 2.

$$c = f(i)$$

The aforementioned drawings FIG. 7 and FIG. 8 illustrate how the tracks 3 of the SMR hard disk drive 1 can be gradually filled based on the index function f(i). Exemplary values for the function can be found in the columns of the depicted table: input values for f(i) are listed in column "logic Cyl. idx. i," which is logical cylinder index "i", and corresponding output values are listed in column "phys. Cyl. # c," which is cylinder number "c".

The functions g(a) and f(i) may be combined into an overall formula that takes LBA number "a" requested by the host system 9 to return the actual cylinder "c", specifying the track 3 on which the requested data are stored.

$$c = f(g(a))$$

For the sake of simplicity, it is initially assumed that the operating system in question uses a file system that stores the file management table (e.g., "File Allocation Table", FAT) at low logical block addresses, that is, LBA numbers close to zero. (Compared with that of a conventional hard disk drive, the file management table used here would be stored at the "beginning" of the drive.)

Moreover, with regard to the drawings, it is assumed here that the SMR hard disk drive 1 is empty and/or formatted and that, in this empty state, the file system allocates low LBA numbers when adding new files. (Compared with a conventional hard disk drive, the "rear portion" of the drive would remain empty.) Possible optimizations for different file systems, such as "New Technology File System" (NTFS), are described in a later section of this disclosure.

Figure 9:
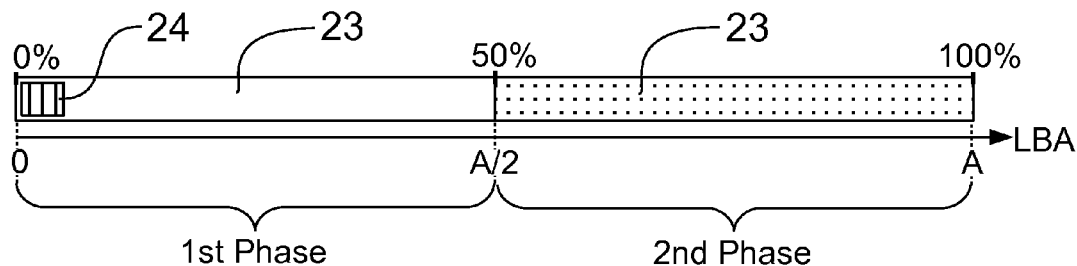
FIG. 9 illustrates the address subsets of the first embodiment.

Address space "A" of the SMR hard disk drive 1, i.e., the range of logical block addresses available for data storage, is divided into address subsets by means of the function f(g(a)). Two address subsets are used in the first embodiment. FIG. 9 shows two bars, representing the address subsets 23, as well as a file management table 24. The LBA axis below the two bars specifies the address space, from zero to A, where the SMR hard disk drive 1 has an overall capacity of "A" sectors 4.

The first address subset 23 contains all LBA numbers from zero to half of address space "A". As the considered file system allocates low LBA numbers when adding new files to the SMR hard disk drive 1, all LBA numbers are substantially located in the first address subset 23, until 50% of the capacity of the SMR hard disk drive 1 is used. This is referred to herein as a "first phase."

If the host system 9 makes a request to write data to logical block addresses from the first address subset 23, new data are written only to a dedicated selection of tracks 3 that are assigned to the first address subset 23 using function f(g(a)). With regard to the first embodiment, the dedicated selection of tracks 3 for the first address subset 23 may consist of the upper and lower track 3 of each band 21, that is, the tracks 3 at the outer boundaries of the bands 21 are used. This is illustrated in FIG. 7: the outer tracks 3 of each band 21 are taken, resulting in a disk surface 2 wherein 50% of available capacity is used.

For illustrative reasons, FIG. 7 depicts an idealized scenario based on the assumption that the file system does not write to any physical sectors 4 or tracks 3 that are assigned to LBA numbers from the upper half of the address space, i.e., from the second address subset 23, as long as less than 50% of available hard disk capacity is being used. It is to be expressly noted that the described process is also fully applicable if, for example, small quantities of physical sectors 4 or tracks 3 from the second address subset 23 are required and/or written at the very beginning or during the "first phase." In such cases, the function f(g(a)) switches to a second dedicated selection of tracks 3, as is described below as "second phase". Phases are to be understood as an instructive aid for illustrating a typical filling sequence and should not be construed as a fixed sequence or necessarily sequential process. A "switch" between phases or address subsets 23 can be made at any time and may not require a special procedure.

With reference to FIG. 7, as soon as the host system 9 starts filling the SMR hard disk drive 1 by issuing write commands with LBA numbers "a", the function g(a) is used to determine logical cylinder index "i." By way of example, the first LBA numbers a=0, a=1, a=2, etc. may be assigned to the logical cylinder index i=0. Next, index function f(i) is used to determine the physical cylinder number "c". As shown in the table in FIG. 7, logical cylinder index i=0 corresponds to physical cylinder #000. In order to write data to the track 3 on cylinder #000, the wide write element 16 is positioned on cylinder pair (#000, #001).

Subsequently, logical cylinder index i=1 results in cylinder #004, as is shown in the table in FIG. 7. In order to write data to the track 3 on cylinder #004, the wide write element 16 is positioned on cylinder pair (#003, #004). The excess width 18 of the write element 16 is always oriented toward the center of the band 21.

As soon as the two outer tracks 3 of the 1st band are filled, the process is continued in the 2nd band. As shown in the table in FIG. 7, logical cylinder index i=2 positions the write element 16 on cylinder pair (#005, #006) and logical cylinder index i=3 positions the write element 16 on cylinder pair (#008, #009), etc.

Depending on the embodiment, a flag for each physical sector 4 or track 3 may be managed by the hard disk controller 10, indicating whether a physical sector 4 or track 3 is taken, i.e., whether the physical sector 4 or track 3 contains valid data. As soon as data are written to a physical sector 4 or track 3, the corresponding flag may be set, as indicated with value "1" in the "Taken" column in FIG. 7. Furthermore, FIG. 7 demonstrates that at the end of the "first phase" the "Taken" flags for the outer tracks 3 of all bands 21 may be set to "1", while the "Taken" flags for the inner tracks 3 retain the value "0".

Optionally, depending on the embodiment, the host system 9 may send a command indicating that a particular physical sector 4 or track 3 no longer contains valid data, such as a TRIM command as defined in ATA specifications. Thereupon, the corresponding "Taken" flag may be reset to zero.

In the first embodiment, when filling an empty SMR hard disk drive 1 consisting of several disk surfaces 2, new data may initially be written to the first disk surface 2. Data tracks 20 are written to the tracks 3 of cylinder pair (#000, #001), and subsequently to the tracks 3 of cylinder pair (#003, #004) and cylinder pair (#005, #006) etc., until the first disk surface 2 is half-full, as shown in FIG. 7. Only then a switch of the read/write heads 8 to the next, yet empty, disk surface 2 in the disk stack 13 takes place. The second disk surface 2 and all subsequent disk surfaces 2 may be filled in a similar manner until 50% of the entire capacity of the SMR hard disk drive 1 is used.

When filling such a disk surface 2 with data by writing data tracks 20, the read/write head 8 performs short seeks to nearby tracks 3, which correspond approximately to the track-to-track seek time of a conventional hard disk drive (non-SMR), that is, the settle-time may dominate.

As long as less than 50% of the capacity of the SMR hard disk drive 1 is used, that is, less than 50% of all tracks 3 are taken, the written data tracks 20 will not overlap, as shown in FIG. 7. Hence, overwriting a track 3 does not require the system to read, buffer and rewrite any adjacent tracks 3, that is, any data stored on the SMR hard disk drive 1 can be updated without necessitating read-modify-write operations. There is no write amplification. Below a fill level of 50% the SMR hard disk drive 1 may therefore achieve a performance roughly equivalent to a conventional hard disk drive (non-SMR), even in the case of random write operations. In many typical application scenarios only a portion of the available capacity is used for a long time.

With reference to the idealized situation shown in FIG. 7, as soon as data are written to the tracks 3 of cylinder pair (#993, #994) on the last disk surface 2, every LBA number of the first address subset 23 may be used, and the corresponding "first phase" may be concluded. At this point, the read/write heads 8 may switch back to the first disk surface 2.

Subsequently, with reference to FIG. 8, the SMR hard disk drive 1 may write data to a dedicated selection of tracks 3 that are assigned to the second address subset 23, referred to herein as the "second phase." The dedicated selection of tracks 3 for the second address subset 23 may consist of the innermost tracks 3 of each band 21, that is, the tracks 3 adjacent to the guard tracks 14. The excess width 18 of the write element 16 is caught by the guard tracks 14 from both sides. As with the first address subset 23 ("first phase"), corresponding "Taken" flags may be set to "1" as soon as valid data are written to a physical sector 4 or track 3 of the second address subset 23.

As the SMR hard disk drive 1 is filled with data, logical cylinder index i=398 positions the write element 16 on cylinder pair (#001, #002), as shown in FIG. 8. Subsequently, logical cylinder index i=399 positions the write element 16 on cylinder pair (#002, #003), and logical cylinder index i=400 positions the write element 16 on cylinder pair (#006, #007), etc., until logical cylinder index i=795 results in the cylinder pair (#992, #993). At this point, the first disk surface 2 is full, that is, all tracks 3 of the first disk surface 2 may be taken. This situation is shown in FIG. 8. Depending on the number of disk surfaces 2 in the disk stack 13, the process may be repeated on the remaining disk surfaces 2 until the second address subset 23, and thus the entire SMR hard disk drive 1, is full.

In order to enable random write operations at any time, when updating or writing data to an outer track 3 of a band 21 (i.e., the first address subset 23), it may be necessary to check whether valid data are already located on the adjacent, inner track 3 (i.e., the second address subset 23). In such cases, the "Taken" flags for the inner track 3 may be evaluated before writing data to physical sectors 4 of the first address subset 23. If the corresponding flag of an adjacent, inner physical sector 4 or track 3 is set to "1" a read-modify-write operation may be necessary to prevent the wide write element 16 from overwriting valid data.

For example, before writing data to the track 3 on cylinder #000, it may be necessary to check whether valid data already exist on the inner, adjacent track 3 of cylinder #001. If the corresponding "Taken" flag is set to "1", the sector data on cylinder #001 must be read and buffered, and must be rewritten after updating or changing sector data on cylinder #000. Otherwise, if the flag is set to "0", the outer track 3 on cylinder #000 can be written without read-modify-write by directly positioning the write element 16 on cylinder pair (#000, #001).

With regard to the worst-case scenario of random write operations when the SMR hard disk drive 1 is full, there are two innermost tracks 3 per band 21 that can be directly overwritten at any time, and there are two tracks 3 at the band boundaries that require a read-modify-write operation. Statistically, 50% of the random write operations can be performed immediately, and for the remaining 50%, merely a single track 3 must be buffered via read-modify-write. Consequently, even in a worst-case scenario, the performance of the first embodiment is reasonably competitive with conventional hard disk drives (non-SMR).

If 75% of the capacity of the SMR hard disk drive 1 is used, the probability that a random write operation can update existing data without read-modify-write is 66.6%. The lower the fill level, the more favorable the percentage ratio. In either case, when adding new data to the empty "rear portion," that is, physical sectors 4 associated with high LBA numbers, no write amplification occurs in the first embodiment.

The first embodiment and further embodiments are characterized by the feature that newly or recently added data, which typically have been written to the empty "rear portion," can be altered instantly, that is, without write amplification. This applies regardless of the current fill level of the SMR hard disk drive 1. This feature is based on the special order in which the tracks 3 are written. The order ensures that newly or recently written data tracks 20 are retained at their full width for as long as possible before they are partially overwritten by adjacent data tracks 20. The invention therefore takes into account that newly or recently added data are generally changed more often than old data.

Moreover, the first embodiment and further embodiments benefit from a conventional disk defragmentation function of most operating or file systems in two ways. The first advantage is known from prior art: defragmentation reduces the amount of fragmentation by pooling fragmented files, thereby creating contiguous files. The objective is to minimize the movements of the read/write head 8 when reading or writing files in order to improve performance.

The second advantage is related to write amplification. Defragmented files are typically stored in the "front portion" of a hard disk drive, that is, at low LBA numbers. The "rear portion," is typically cleaned up and set free. A TRIM function may be used to release invalid data. With regard to the first embodiment, the "front portion" of the SMR hard disk drive 1 corresponds to the first address subset 23 (i.e., "first phase" as per FIG. 7 and FIG. 9) in which the outer tracks 3 of the bands 21 are written. Hence, defragmentation automatically reduces the number of overlapping data tracks 20 and, therefore, the number of read-modify-write operations. The performance of the SMR hard disk drive 1 is improved.

For example, let it be assumed that a hard disk drive 1 is highly fragmented, characterized by many overlapping data tracks 20 distributed throughout all disk surfaces 2. Furthermore, let it be assumed that the hard disk drive 1 is half full (or less than half full). After running a conventional disk defragmentation, all data are located within the first address subset 23, and in accordance with the first embodiment, all data are therefore stored on the outer tracks 3 of the bands 21 without any overlapping data tracks 20 as per FIG. 7. Since no read-modify-write operations are necessary in this state ("first phase"), defragmentation has significantly improved performance.

Figure 10:
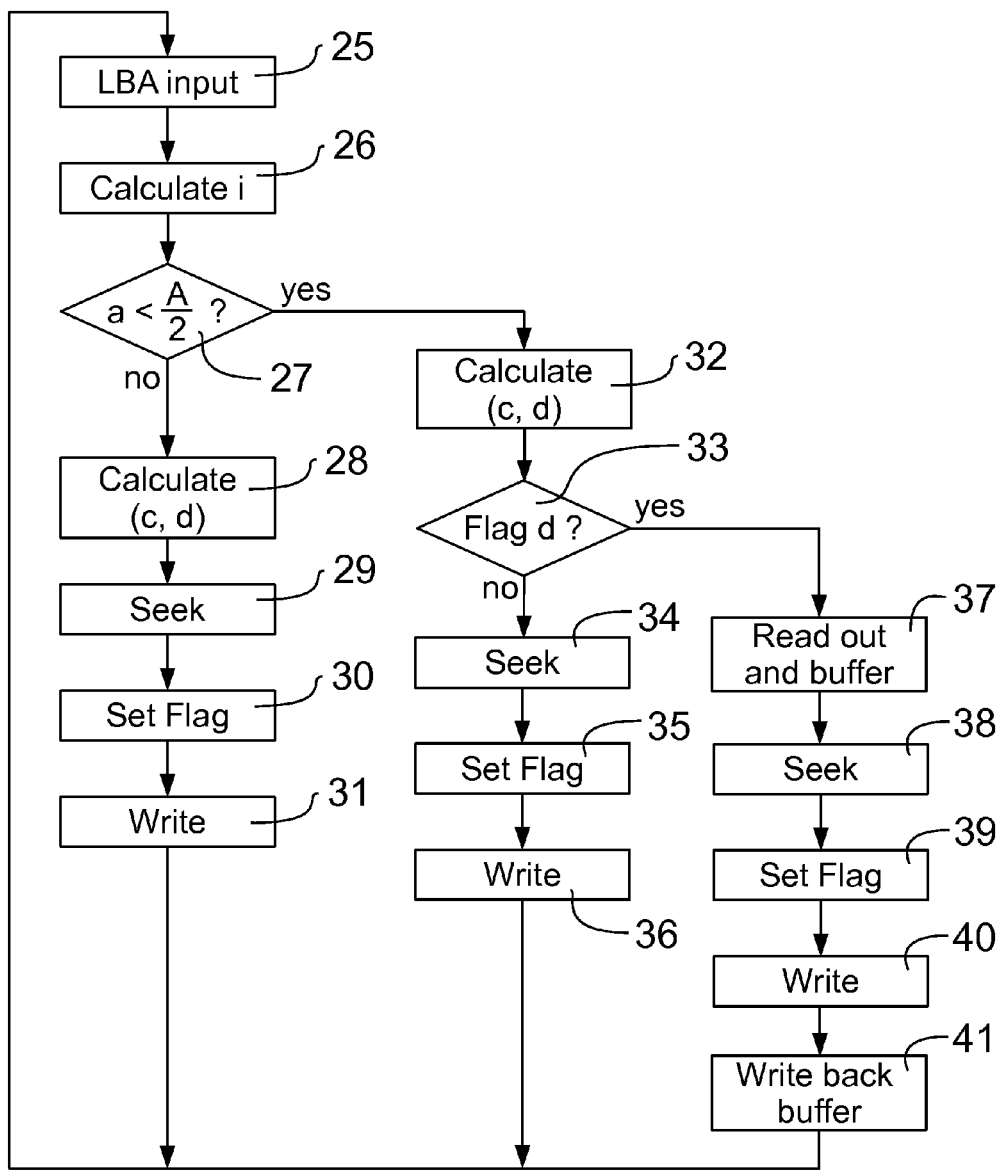
FIG. 10 is a flowchart according to the first embodiment.

FIG. 10 shows a flowchart of the first embodiment, which is suitable, inter alia, for random write operations. The number of available bands 21 per disk surface 2, (e.g., 199 bands as per FIG. 7 and FIG. 8) is represented by variable "n", where "n" multiplied by five tracks 3 per band 21 yields the total number of tracks 3 (e.g., 995 tracks as per FIG. 7 and FIG. 8). LBA numbers are represented by variable "a", and the total capacity of the SMR hard disk drive 1 in terms of LBAs is represented by variable "A", that is, "A" specifies the address space.

In a first step 25, the disk controller 10 receives LBA number "a" from the host system 9. The LBA number "a" may be part of a write command, e.g., for a random write operation. The subsequent step 26 calculates logical cylinder index "i", as described above.

$$i=g(a)$$

The first address subset 23 is the interval between zero and half of address space "A". Step 27 checks whether the received LBA number "a" is located in the first or second address subset 23.

$$a < \frac{A}{2}$$

If the inequality is not satisfied, LBA number "a" comes from the second address subset 23. In this case, the corresponding sector data are written to one of the inner tracks 3 of the bands 21, and this can be done directly, without read-modify-write. For this purpose, step 28 determines the cylinder pair (c, d) over whose tracks 3 the write element 16 must be positioned to write the data track 20. Variable "c" is the cylinder number of the target sector 4, that is, the designated location where the sector data will be written, and "d" is the cylinder number of the guard track 14, which is required because of the wide write element 16. Cylinder numbers "c" and "d" are calculated using the following index function f(i), where "div" means "integer division" and where "mod" is the "remainder" (integer modulo).

$$j=i-2n$$

$$c=5(j \text{ div } 2)+2(j \text{ mod } 2)+1$$

$$d=5(j \text{ div } 2)+2$$

Step 29 positions the write element 16 on cylinder pair (c, d), and in step 30, the "Taken" flag of the target sector 4 is set to "1" so that the sector data can be written by the write element 16 in step 31.

Returning to step 27, if LBA number "a" refers to the first address subset 23, cylinder pair (c, d) is determined in step 32 using the following index function f(i).

$$c=5(i \text{ div } 2)+4(i \text{ mod } 2)$$

$$d=5(i \text{ div } 2)+2(i \text{ mod } 2)+1$$

In this case "c" is the cylinder number of a track 3 located at a band boundary. The cylinder number "d" is the location of the adjacent, inner track 3 and due to the excess width 18 of the write element 16 this track 3 is at least partially overwritten when data are written to the target sector 4 on cylinder "c". It is therefore necessary to check whether valid data are stored on the adjacent, inner track 3, at least in the relevant range. This is done in step 33 by evaluating the corresponding "Taken" flag on cylinder "d".

If the corresponding physical sector 4 on cylinder "d" is not taken (flag="0"), the writing process can start immediately. Step 34 positions the write element 16 on cylinder pair (c, d) and in step 35, the "Taken" flag of the target sector 4 is set to "1" so that sector data can be written by the write element 16 in step 36.

Returning to step 33, if the corresponding physical sector 4 on cylinder "d" is already taken (flag="1"), it may be necessary to perform a read-modify-write operation. In step 37, the data of the corresponding physical sector 4 on cylinder "d" are read by the read element 17 and stored at a temporary location or in a memory or cache 11. Subsequently, in step 38, the write element 16 is positioned on cylinder pair (c, d), and in step 39, the "Taken" flag of the target sector 4 is set to "1" so that sector data can be written by the write element 16 in step 40.

Finally, in step 41 the temporarily stored data (located at the temporary location or in the memory or cache 11) must be restored to the adjacent track 3 on cylinder "d", as at least part of this track 3 has been overwritten during the preceding write process. The write element 16 is positioned such that the excess width 18 is caught by the adjacent guard track 14.

FIG. 11 shows a second embodiment, which is similar to the first embodiment except that the overlaps of the data tracks 20 are aligned in the opposite direction. Analogous to the depiction in FIG. 6, the overlapping data tracks 20 diverge in the middle of the bands 22, whereas the guard tracks 14 are located between the bands 22.

The disk surface 2, as depicted in FIG. 11, is completely filled, that is, all tracks 3 are taken. This corresponds to the situation depicted in FIG. 8 (first embodiment). As before, logical cylinder index "i" specifies the order in which the tracks 3 on the disk surface 2 are to be filled. Column "logic Cyl. idx. i" in FIG. 11 sets forth that, in this case, the two inner-most tracks 3 in each band 22 are assigned to the first address subset 23 ("first phase"), whereas the outer tracks 3 in each band 22 are assigned to the second address subset 23 ("second phase") and are therefore written later.

The "inverted" arrangement of overlapping data tracks 20, as per FIG. 11, has a comparable performance to the arrangement in the first embodiment and is therefore equally preferable. Further embodiments characterized by an "inverted" arrangement of overlapping data tracks 20 are omitted solely to keep the number of drawings manageable.

Figure 12:
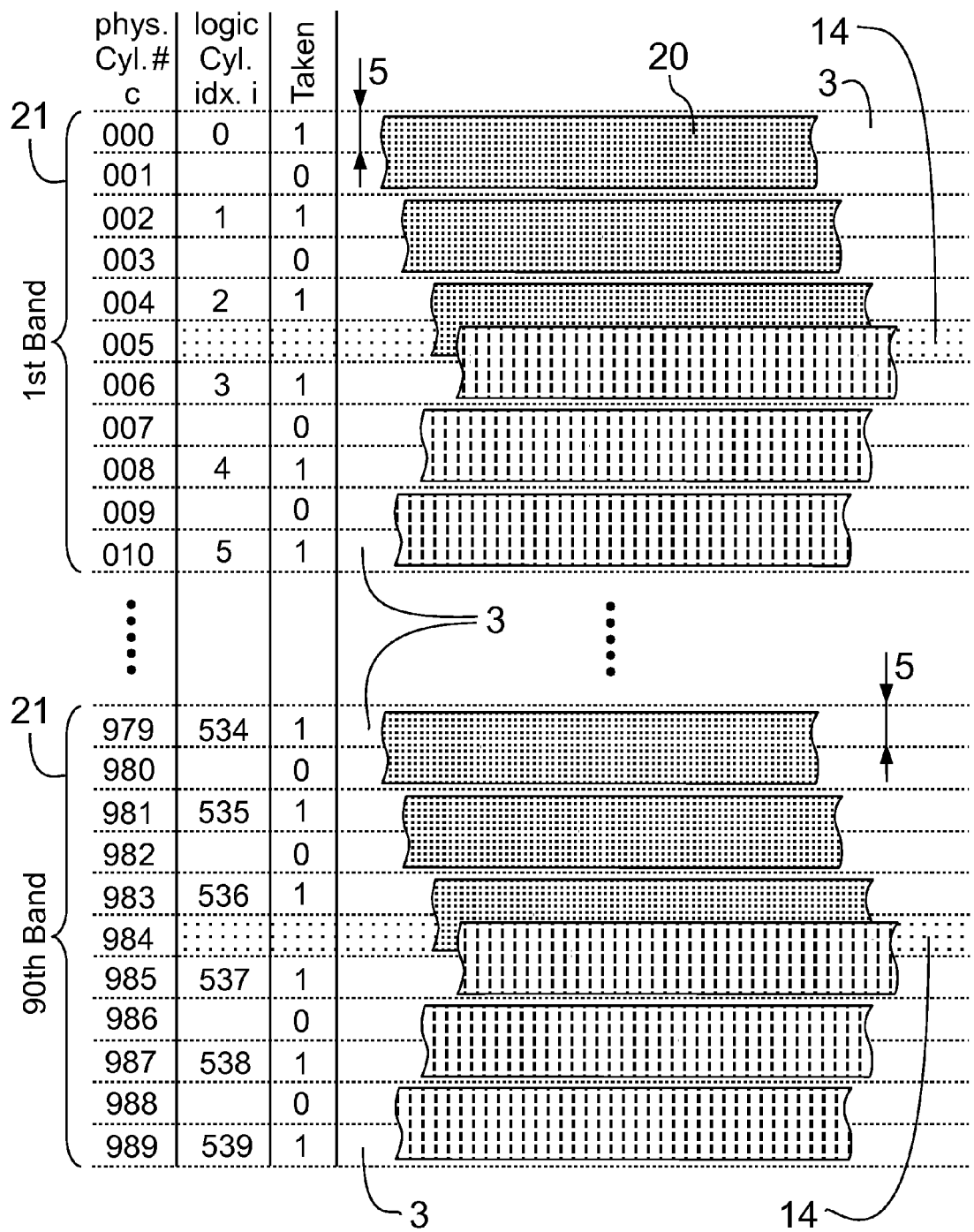
FIG. 12 shows the end of a "first phase," 60% of disk capacity is used. (third embodiment)
Figure 13:
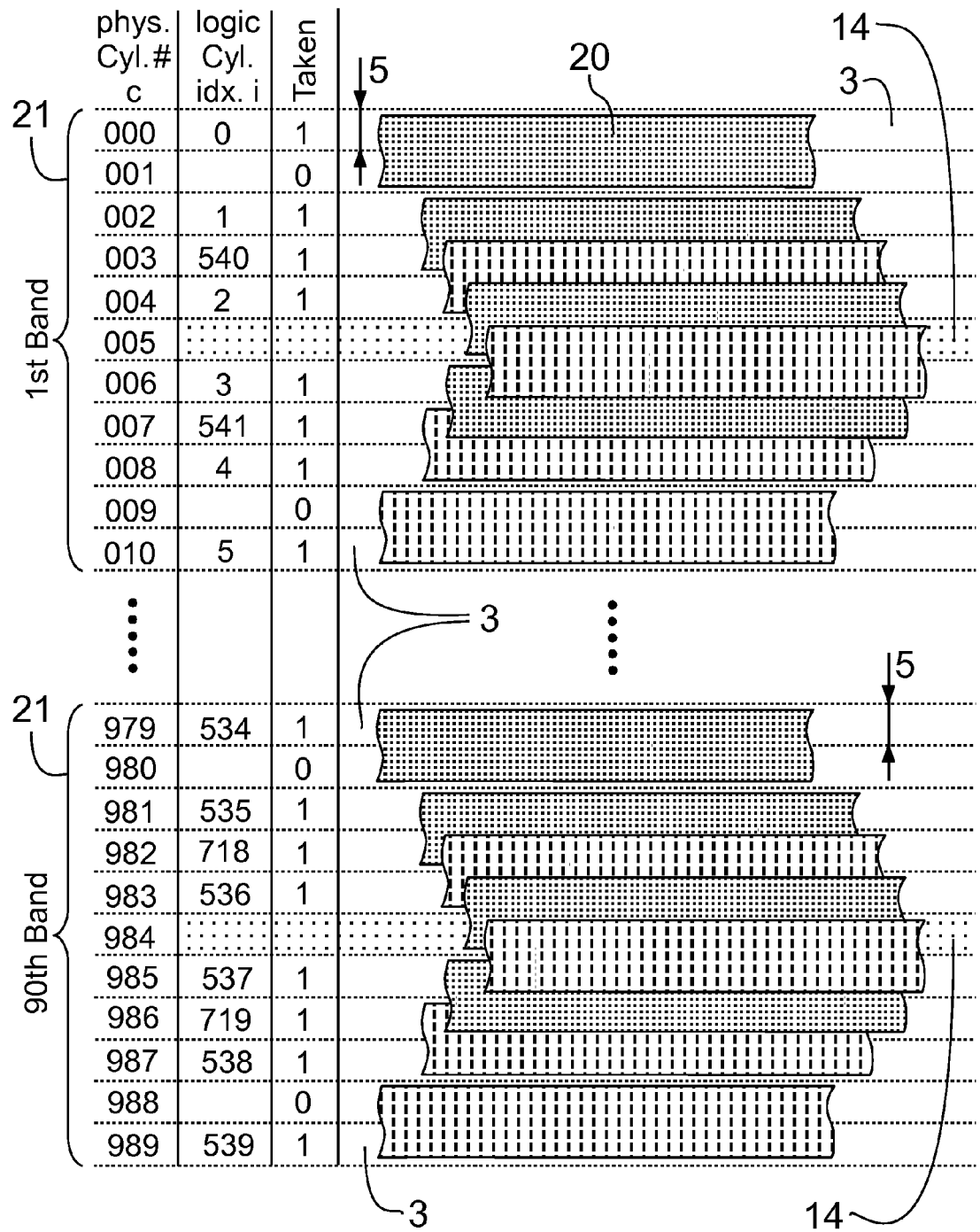
FIG. 13 shows the end of a "second phase," 80% of disk capacity is used. (third embodiment)
Figure 14:
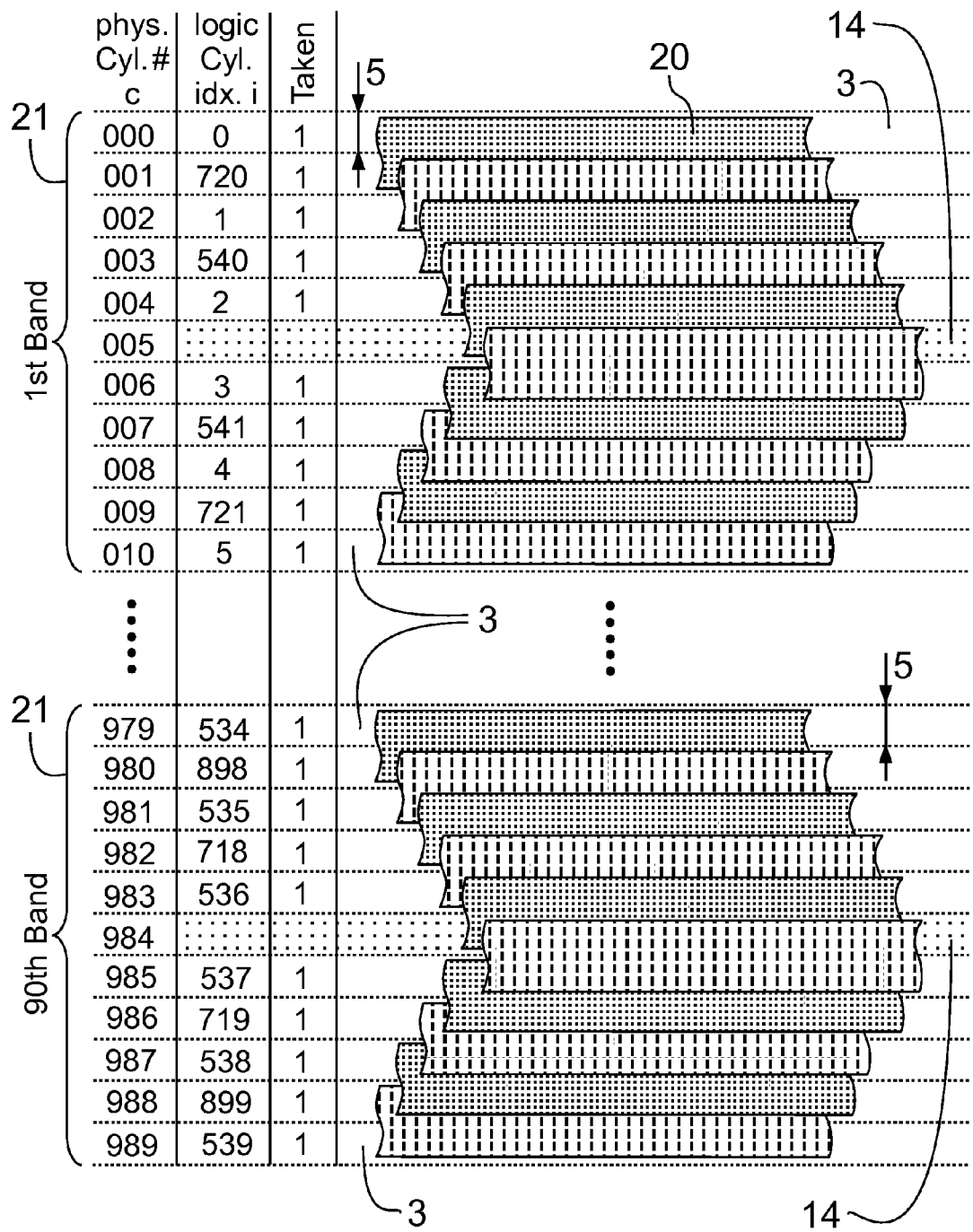
FIG. 14 shows the end of a "third phase," disk full. (third embodiment)

FIG. 12 through FIG. 14 show a third embodiment. The effective track width of the write element 16 is twice the track width 5 of the read element 17. Symmetrical bands 21 are used whose guard tracks 14 are located in the middle of the bands 21. Each band 21 comprises eleven tracks 3, ten of which can be used for data storage. In the present example, as illustrated in FIG. 12 through FIG. 14, a disk surface 2 contains 990 tracks, counted from cylinder #000 to cylinder #989, grouped into 90 bands. The values of index function f(i), as used in the third embodiment, can be found in columns "phys. Cyl. # c" and "logic Cyl. idx. i" of the tables. Whether a physical sector 4 or track 3 contains valid data is indicated in the "Taken" column.

The total capacity of the SMR hard disk drive 1, is represented by value "A", where "A" specifies the address space in terms of LBAs. In the third embodiment, address space "A" is divided into three address subsets 23. The first address subset 23 comprises the first 60% of addressable sectors 4, and therefore all LBA numbers in the interval between zero and 0.6 A. The second and third address subsets 23 encompass LBA numbers from intervals of 0.6 A to 0.8 A and 0.8 A to A, that is, addressable sectors 4 that are typically used at fill levels above 60% and 80%, respectively. When filling an empty SMR hard disk drive 1 by means of the three address subsets 23, such processes are referred to herein as "first phase," "second phase," and "third phase."

FIG. 12 shows a disk surface 2 at the end of the "first phase," the point reached when 60% of the tracks 3 on each disk surface 2 in the disk stack 13 are used. Six of ten available tracks 3 per band 21 are taken, as indicated in the "Taken" column. It can be seen that the first address subset 23 (i.e., "first phase") is assigned to a dedicated selection of tracks 3 chosen in such a way that, when writing data with the write element 16, the resulting data tracks 20 do no overlap, with the exception of the guard tracks 14. For example, based on the numbering of "logic Cyl. idx. i," data are first written to cylinder pair (#000, #001) and, subsequently, to cylinder pair (#002, #003) and cylinder pair (#004, #005). Since the guard track 14 on cylinder #005 can catch the excess width 18 of the write element 16 from both sides, the next data track 20 can be written onto the tracks 3 of cylinder pair (#005, #006).

Logical cylinder index i=539 results in writing data to the last cylinder pair (#988, #989) of a disk surface 2. At this stage, 60% of the tracks 3 on the disk surface 2 are taken, and the read/write heads 8 switch to the next disk surface 2 in the disk stack 13, until 60% of the tracks 3 on all disk surfaces 2 are taken.

In the "first phase," while continuously filling the SMR hard disk drive 1 with data, the read/write head 8 performs short seeks to nearby tracks 3, which correspond approximately to the track-to-track seek time of a conventional hard disk drive (non-SMR), that is, the settle-time may dominate. In the middle of each band 21 the distance from track 3 to track 3 is even shorter, due to the overlapping data tracks 20 on the guard track 14. Typically, no read-modify-write is required during the "first phase" (e.g., up to a fill level of 60%). Even if existing data are updated (e.g., random write operations) no write amplification may occur, since the data tracks 20 do not overlap. Thus, in the "first phase," the characteristics and performance of the SMR hard disk drive 1 may correspond to that of a conventional hard disk drive (non-SMR).

When 60% of the tracks 3 on all disk surfaces 2 are taken, substantially all LBA addresses of the first address subset 23 may be assigned to stored data, and the end of the "first phase" is reached. At the start of the "second phase" the read/write heads 8 may switch back to the first disk surface 2.

FIG. 13 shows a disk surface 2 at the end of the "second phase," which is reached when 80% of the tracks 3 on each disk surface 2 in the disk stack 13 are used. Eight of ten available tracks 3 per band 21 are taken, as indicated in the "Taken" column. It can be seen that the second address subset 23 (i.e., "second phase") is assigned to a dedicated selection of tracks 3 that are chosen in such a way that from the still unused tracks 3 those two tracks 3 are selected per band 21 that are located as close as possible to the guard track 14. This is done to reduce the write amplification. When adding new data, it may be sufficient to perform a read-modify-write operation for a single track 3 (the innermost track 3 adjacent to the guard track 14).

The "second phase" is responsible for a logical cylinder index of i=540 to i=719. By way of example, logical cylinder indices i=540 and i=541, result in cylinder #003 and cylinder #007, respectively. In order to write data to the tracks 3 of these cylinders a read-modify-write may be required, since the wide write element 16 writes data tracks 20 on cylinder pair (#003, #004) and cylinder pair (#006, #007), the tracks 3 on cylinders #004 and #006 already being taken.

As soon as data have been added to the tracks 3 on cylinder #982 and cylinder #986 in the 90th band, 80% of the tracks 3 on a disk surface 2 are taken. Subsequently, the read/write heads 8 may switch to the next disk surface 2 in the disk stack 13, until 80% of the tracks 3 on all disk surfaces 2 are taken. At this point, the final "third phase" is reached.

FIG. 14 shows the tracks 3 of a full disk surface 2 at the end of the "third phase," which is responsible for a logical cylinder index of i=720 to i=899. The corresponding third address subset 23 is assigned to a dedicated selection of tracks 3 comprising the last free tracks 3 in each band 21 (e.g., the tracks 3 on cylinder #001 and cylinder #009 in the 1st band). This gives rise to increased write amplification, as it may be necessary to carry out read-modify-write operations for three tracks 3 when writing data to the remaining free tracks 3. The last 20% of storage capacity of the SMR hard disk drive 1 thus constitutes a reserve capacity that can be used with reduced, but practicable performance.

Figure 16:
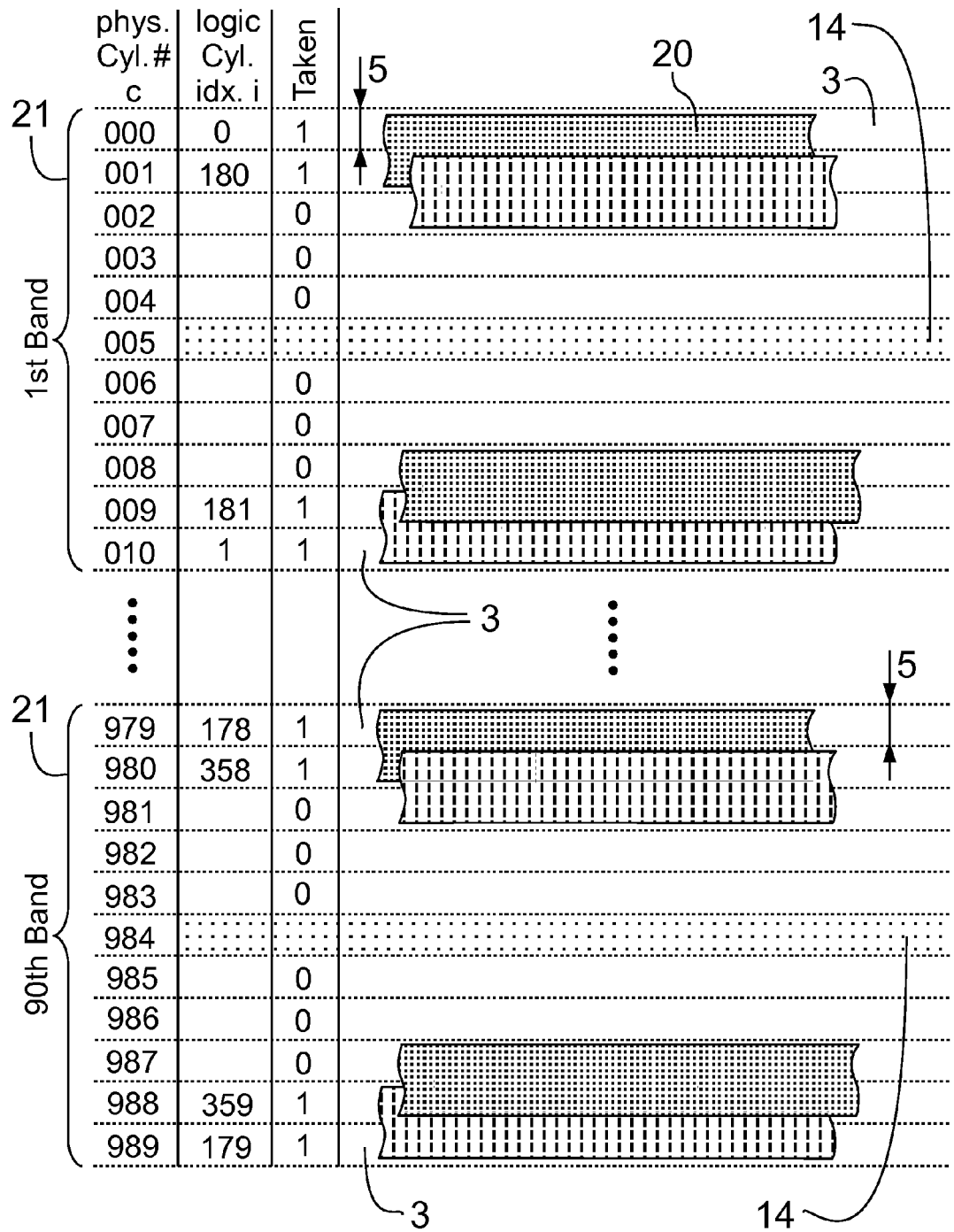
FIG. 16 shows the end of a "second phase," 40% of disk capacity is used. (fourth embodiment)
Figure 17:
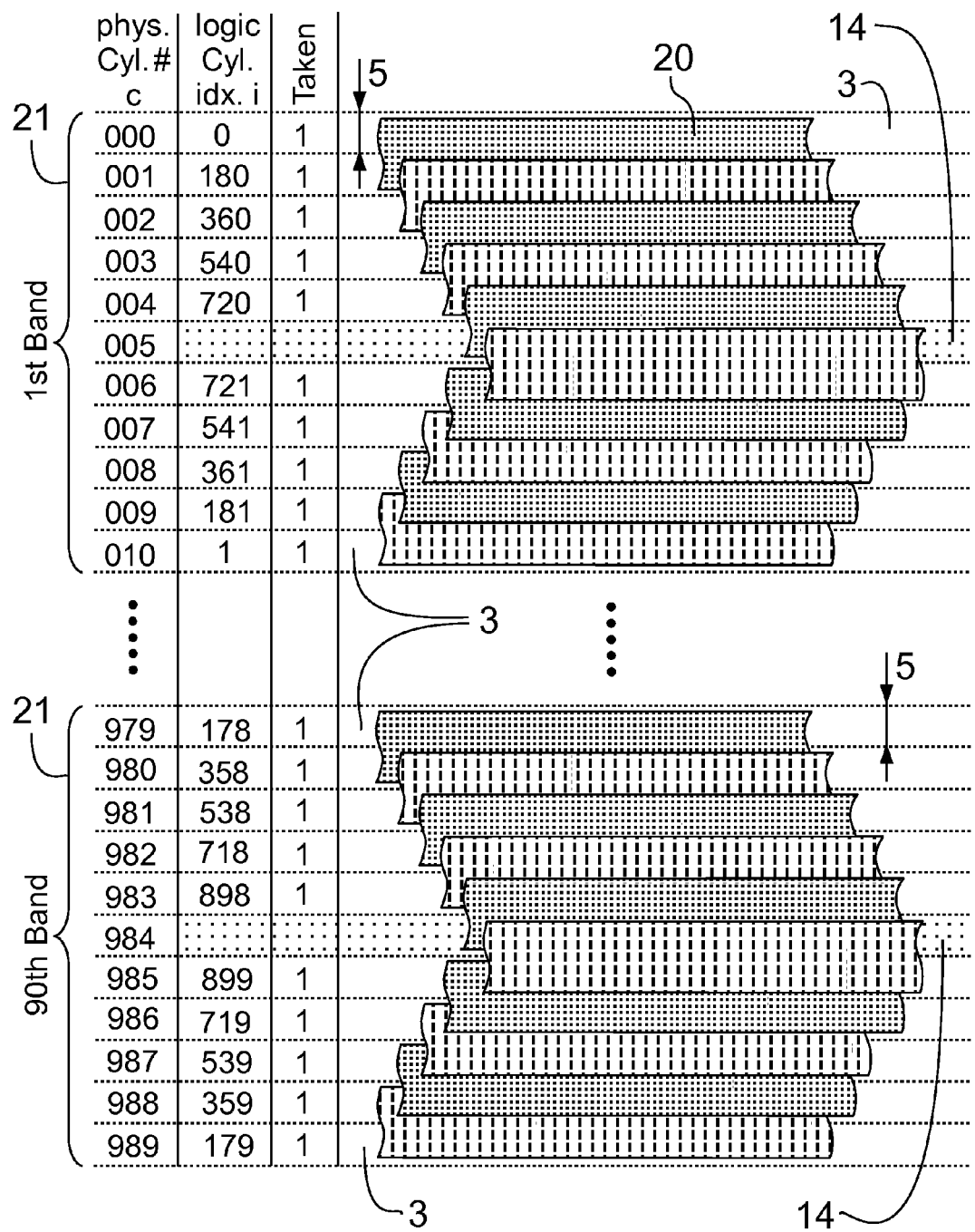
FIG. 17 shows the end of a "fifth phase," disk full. (fourth embodiment)

FIG. 15 through FIG. 17 show a fourth embodiment, which corresponds to the third embodiment with regard to the number of tracks 3, number of bands 21, capacity, address space "A" (LBAs from zero to A), and read/write heads 8. However, in contrast to the third embodiment, a different strategy, that is, a different order is used to write data to the tracks 3 of the bands 21. For this purpose, address space "A" of function f(g(a)) is divided into five address subsets 23, each encompassing 20% of addressable sectors 4, that is, address subsets 23 with intervals of zero to 0.2 A, 0.2 A to 0.4 A, 0.4 A to 0.6 A, 0.6 A to 0.8 A and 0.8 A to A. For purposes of illustration, an empty SMR hard disk drive 1 is filled in five "phases," a dedicated selection of two tracks 3 per band 21 being added in each "phase." Each dedicated selection of tracks 3 belongs to a corresponding address subset 23.

In the "first phase," shown in FIG. 15, the two outer tracks 3 of each band 21 are assigned to the first address subset 23. By way of example, data are added to the tracks 3 of cylinder #000 and cylinder #010 by writing data tracks 20 on cylinder pair (#000, #001) and cylinder pair (#009, #010). The "first phase" is responsible for a logical cylinder index of i=0 to i=179, as can be seen in the table under "logic Cyl idx. i". This may correspond to the first 20% of the hard disk drive capacity. There is no write amplification.

FIG. 16 shows the "second phase," which is responsible for a logical cylinder index of i=180 to i=359. This may correspond to a fill level between 20% and 40%. Data are added to the inwardly adjacent tracks 3. For example, the tracks 3 on cylinder #001 and cylinder #009 may be assigned to the second address subset 23 and therefore data tracks 20 may be written to cylinder pair (#001, #002) and cylinder pair (#008, #009) in the 1st band.

As shown by the occupancy of the bands 21 in FIG. 16, no write amplification occurs when adding new data or when changes are made to the last 20% of newly added data. This is true at every fill level. For example, at a fill level of 30%, the last 20% of newly added data (including such data that have been added during the "first phase") can be changed right away, without necessitating read-modify-write operations. This can be explained by the fact that at every fill level, there are exactly two tracks 3 per band 21 (thus 20%) that can be directly overwritten at any time. A read-modify-write may be required only when changing older data, in this example, sector data assigned to the first 10% of the address space "A".

The "third phase" and the "fourth phase" are not depicted as drawings. In their approach they correspond to the "second phase" as per FIG. 16. The "third phase" is responsible for a logical cylinder index of i=360 to i=539, and the "fourth phase" is responsible for a logical cylinder index of i=540 to i=719. (This is reflected in the "logic Cyl. idx. i" column of FIG. 17.) In each "phase" data are added to the next inwardly adjacent tracks 3 in the bands 21. For instance, in the "third phase," data tracks 20 are written on the tracks 3 of cylinder pair (#002, #003) and cylinder pair (#007, #008). No write amplification occurs when adding new data or when changes are made to the last 20% of newly added data.

FIG. 17 shows the tracks 3 of a full disk surface 2 at the end of the fifth and final "phase," which is responsible for a logical cylinder index of i=720 to i=899. The corresponding fifth address subset 23 is assigned to a dedicated selection of tracks 3 comprising the tracks 3 adjacent to the guard tracks 14, for example the tracks 3 on cylinder #004 and cylinder #006 in the 1st band, for which the write element 16 may be positioned on cylinder pair (#004, #005) and cylinder pair (#005, #006), respectively. In the fourth embodiment, updates or changes to the last 20% of newly or recently added data can be written immediately, that is, without read-modify-write, even if the SMR hard disk drive 1 is completely full.

When comparing the third and fourth embodiments, those skilled in the art will recognize that the various strategies that can be used to write data to the tracks 3 on the disk surfaces 2 have different advantages and/or disadvantages. Those skilled in the art will therefore choose an embodiment or a variant that is particularly suited to a specific purpose.

For instance, the third embodiment may not require any read-modify-write operations up to a fill level of 60%, even in the case of random write operations or when changing existing data. Therefore, one conceivable application scenario would be a database that increases in size slowly and has frequently changing contents.

The fourth embodiment is characterized in that no read-modify-write operations may be required to change any newly or recently added data, even in the case of random write operations. Therefore, one conceivable application scenario would be a file server that stores large amounts of data, while the users typically make changes to newly or recently added files, that is, files pertaining to current topics or issues.

Figure 18:
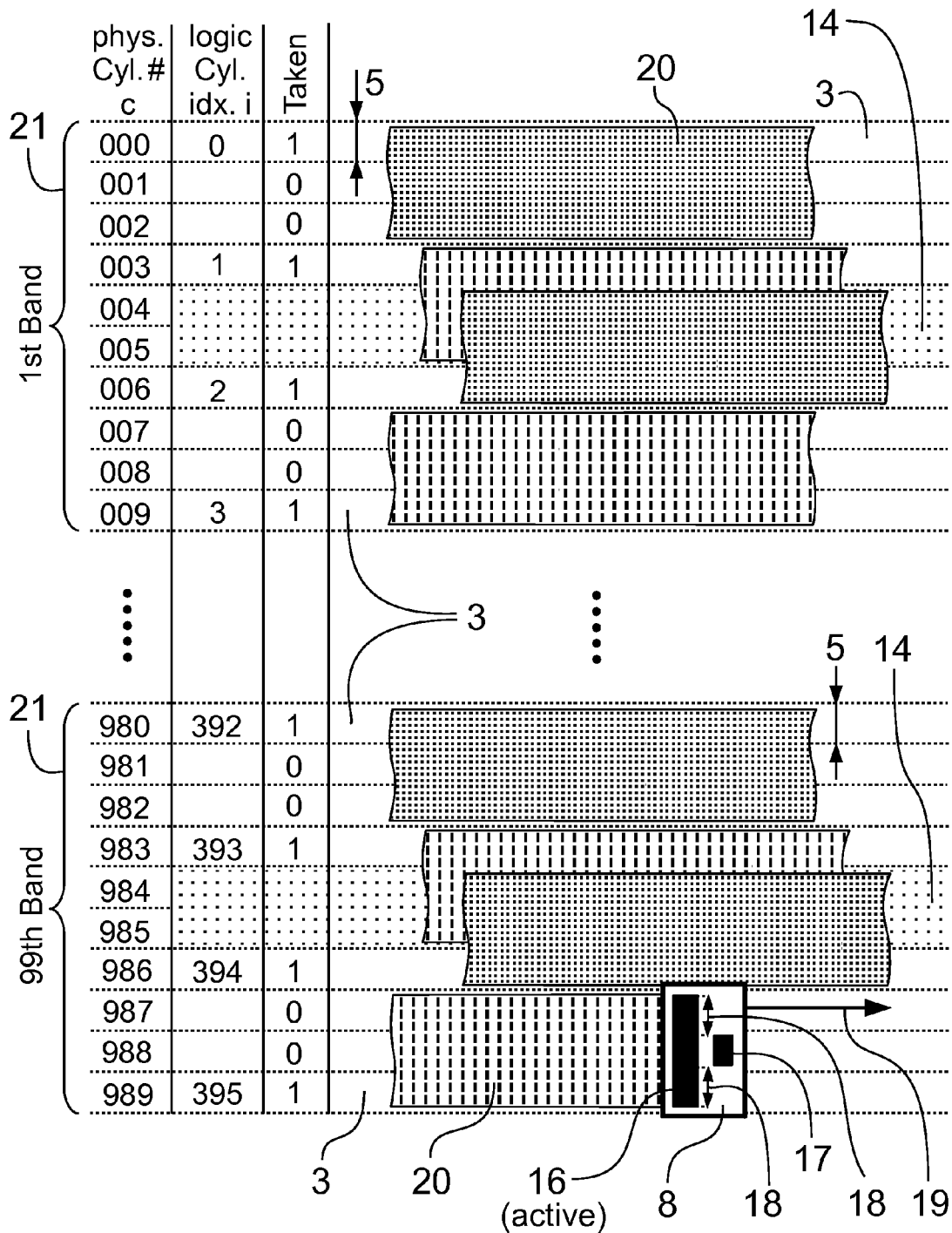
FIG. 18 shows the end of a "first phase," 50% of disk capacity is used. (fifth embodiment)
Figure 19:
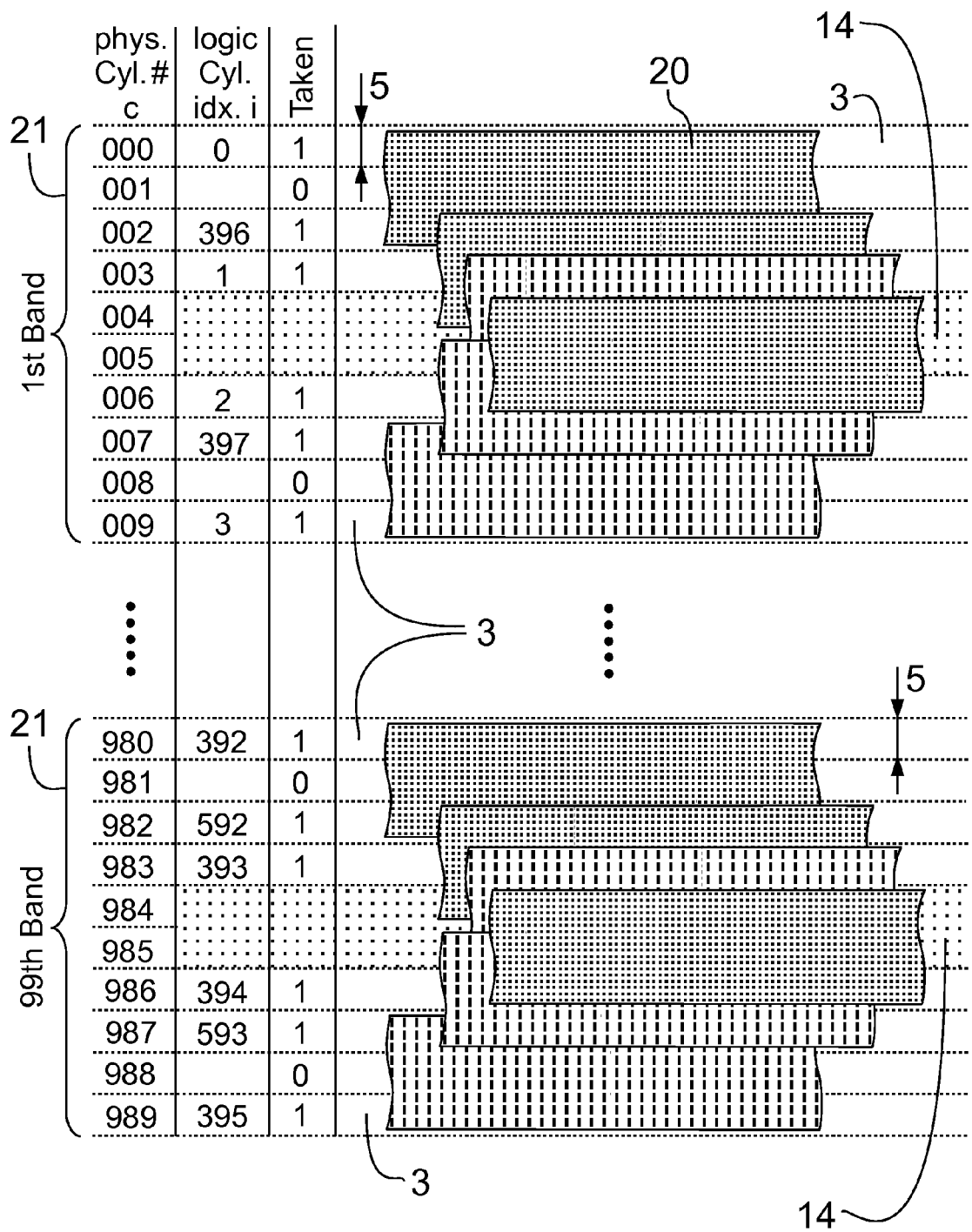
FIG. 19 shows the end of a "second phase," 75% of disk capacity is used. (fifth embodiment)
Figure 20:
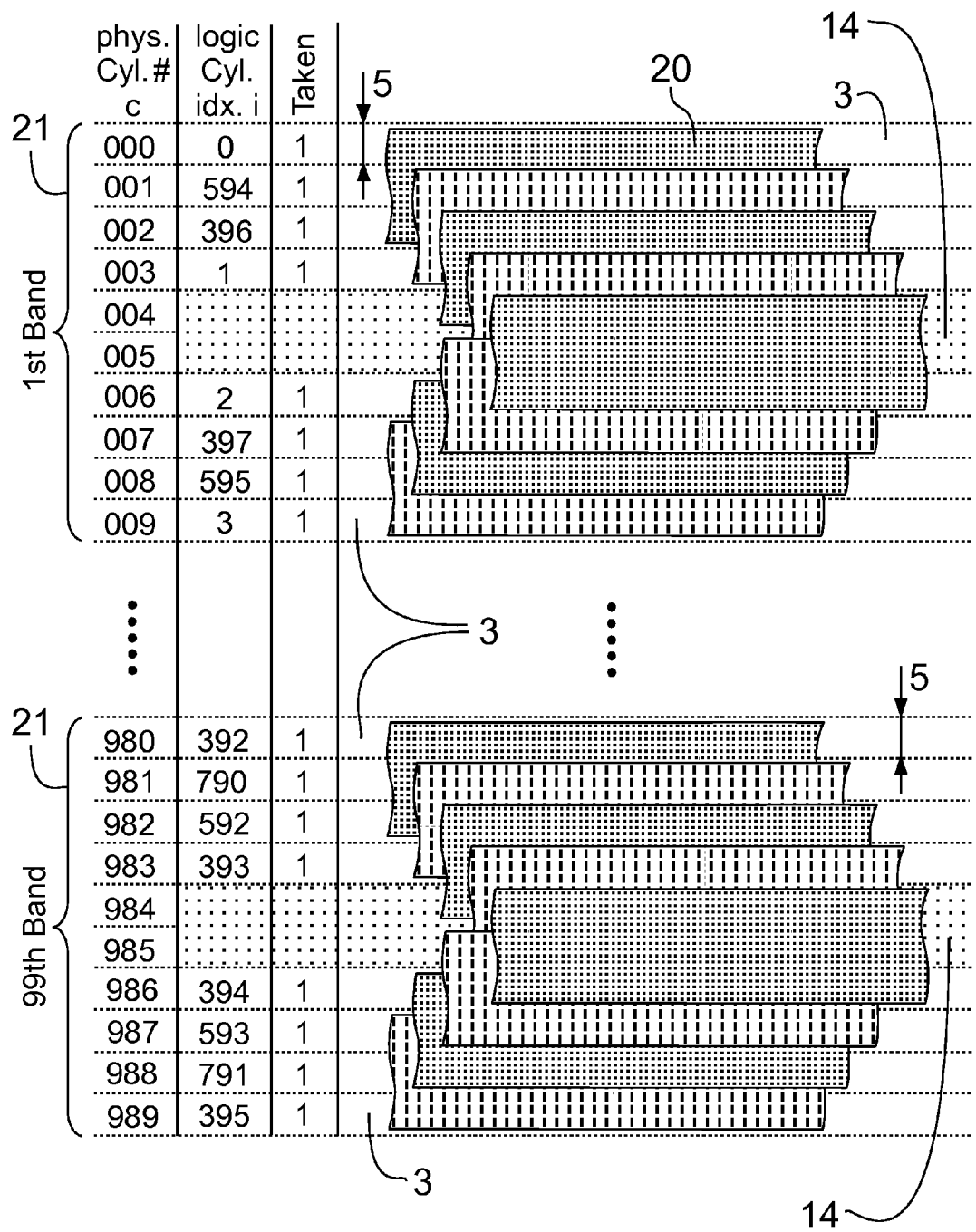
FIG. 20 shows the end of a "third phase," disk full. (fifth embodiment)

FIG. 18 through FIG. 20 show a fifth embodiment. The effective track width of the write element 16 is three times as wide as the track width 5 of the read element 17, as can be seen from the read/write head 8 depicted in FIG. 18. The excess width 18 of the write element 16, as defined in the present disclosure, is the difference between the effective track width of the write element 16 and the track width 5 of the read element 17. Accordingly, with regard to FIG. 18, the excess width 18 is the sum of the length of the two arrows 18 on both sides of the read element 17.

In this context, the term "excess width 18 of write element 16" is to be interpreted regardless of the position of the read element 17 within the read/write head 8 and regardless of the corresponding arrows 18 depicted in FIG. 18. E.g., the excess width 18 may be located on either sides of the write element 16, depending on whether the write element 16 writes to a track 3 in the upper or lower half of a band 21.

Since the write element 16 writes data tracks 20 of triple track width 5, a guard region 14 that covers a width no less than two tracks 3 is required (at least double track width 5). The fifth embodiment utilizes symmetrical bands 21 that have a guard region 14 in the middle of each band 21. Eight tracks 3 per band 21 may be used for storing data while two tracks 3 per band 21 are required as guard region 14. As illustrated in FIG. 18 through FIG. 20, a disk surface 2 may contain 990 tracks, counted from cylinder #000 to cylinder #989, grouped into 99 bands.

With regard to the order or sequence in which the tracks 3 on a disk surface 2 are written, the fifth embodiment makes use of a strategy similar to that of the third embodiment, and may therefore, inter alia, be suitable for files and/or databases whose contents change frequently. For this purpose, address space "A" (LBAs from zero to A) is divided into three address subsets 23 by means of the function f(g(a)), with intervals of zero to 0.5 A, 0.5 A to 0.75 A and 0.75 A to A. Filling an empty SMR hard disk drive 1 according to this embodiment may be considered as taking place in three "phases."

FIG. 18 shows a disk surface 2 at the end of the "first phase," which may be reached at a fill level of 50%. The "first phase" is responsible for a logical cylinder index of i=0 to i=395, as can be seen in the table under "logic Cyl idx. i". The corresponding first address subset 23 is assigned to a dedicated selection of tracks 3 comprising four tracks 3 per band 21, for example the tracks 3 on cylinders #000, #003, #006, and #009 in the 1st band, as indicated by value "1" in the "Taken" column. The written data tracks 20 do not overlap, with the exception of the guard regions 14. That is, the excess width 18 of the write element 16 is caught by empty, adjacent tracks 3 or by the guard region 14. Hence, no read-modify-write operations are required when updating existing data.

FIG. 19 shows the "second phase," which is responsible for a logical cylinder index of i=396 to i=593. This may correspond to a fill level between 50% and 75%. The second address subset 23 is assigned to a dedicated selection of tracks 3 comprising two tracks 3 per band 21, for example, the tracks 3 on cylinder #002 and cylinder #007 in the 1st band, such that new data are added by writing data tracks 20 on the triple sets of cylinders (#002, #003, #004) and (#005, #006, #007). The tracks 3 on cylinder #003 and cylinder #006, which already contain valid data, are overwritten, necessitating a read-modify-write. Since this read-modify-write involves a single track 3, practicable performance can be achieved up to a fill level of 75%.

FIG. 20 shows the tracks 3 of a full disk surface 2 at the end of the third and final "phase," which is responsible for a logical cylinder index of i=594 to i=791. By means of the third address subset 23, data are added to the last free tracks 3 in the bands 21, for example on cylinder #001 and cylinder #008 in the 1st band. This results in increased write amplification so that the last 25% of storage capacity may be considered reserve capacity that runs with reduced performance.

Figure 21:
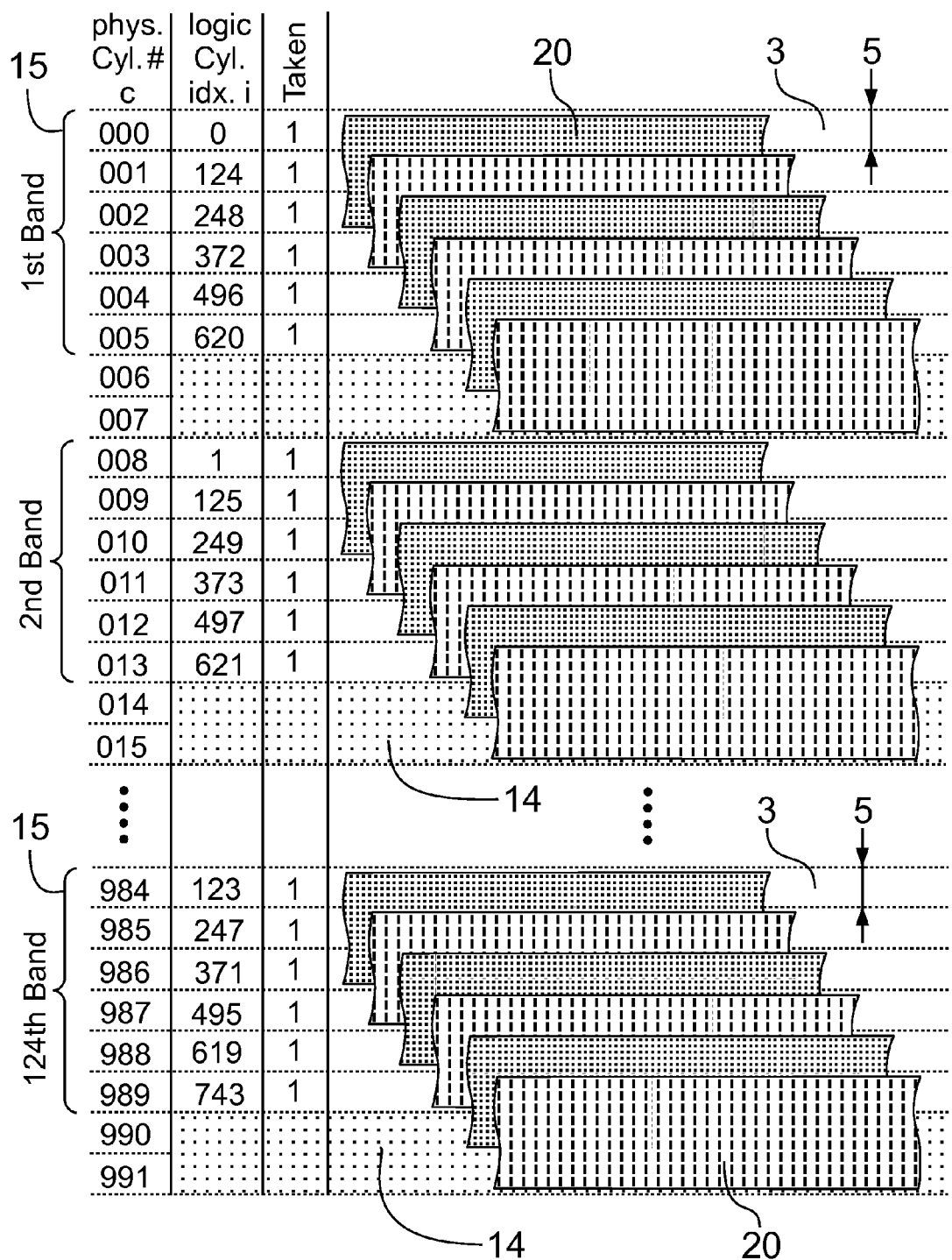
FIG. 21 shows a sixth embodiment, which utilizes conventional bands.

With reference to FIG. 21 a sixth embodiment is introduced. In regard to the order or sequence in which the tracks 3 on a disk surface 2 are written, the sixth embodiment utilizes a strategy comparable to that of the fourth embodiment. No write amplification occurs when adding new data or making changes to newly added data. In contrast to the previous embodiments, conventional bands 15 (as per FIG. 3) are used, characterized by overlaps in a single radial direction.

The effective track width of the write element 16 is three times as wide as the track width 5 of the read element 17. The guard region 14 covers two tracks 3, i.e., a double track width 5. Six tracks 3 per band 15 may be used for storing data. A disk surface 2 contains 992 tracks, counted from cylinder #000 to cylinder #991, grouped into 124 bands.

Address space "A" (LBAs from zero to A) is divided into six address subsets 23 of equal size, with intervals of zero to A/6, A/6 to 2 A/6, 2 A/6 to 3 A/6, 3 A/6 to 4 A/6, 4 A/6 to 5 A/6 and 5 A/6 to A. A dedicated selection of one track 3 per band 15 is assigned to each address subset 23. Filling an empty SMR hard disk drive 1 according to this embodiment may be considered to take place in six "phases." In accordance with the address subsets 23, the "first phase" is responsible for a logical cylinder index of i=0 to i=123; "second phase": i=124 to i=247; "third phase": i=248 to i=371; "fourth phase": i=372 to i=495; "fifth phase": i=496 to i=619 and "sixth phase": i=620 to i=743. In each "phase," only one track 3 per band 15 is added.

FIG. 21 shows the tracks 3 of a full disk surface 2 at the end of the sixth and final "phase." The "phases" one through five can be traced and comprehended by means of the "logic Cyl. idx. i" column. In each "phase," the bands 15 are "filled" on a track-by-track basis, starting with the upper track 3 in each band 15. E.g., with respect to the 1st band, data are added to the track 3 on cylinder #000 in the "first phase." Subsequently, in the "second phase," data are added to the track 3 on cylinder #001 and in the "third phase" to the track 3 on cylinder #002, etc.

Figure 22:
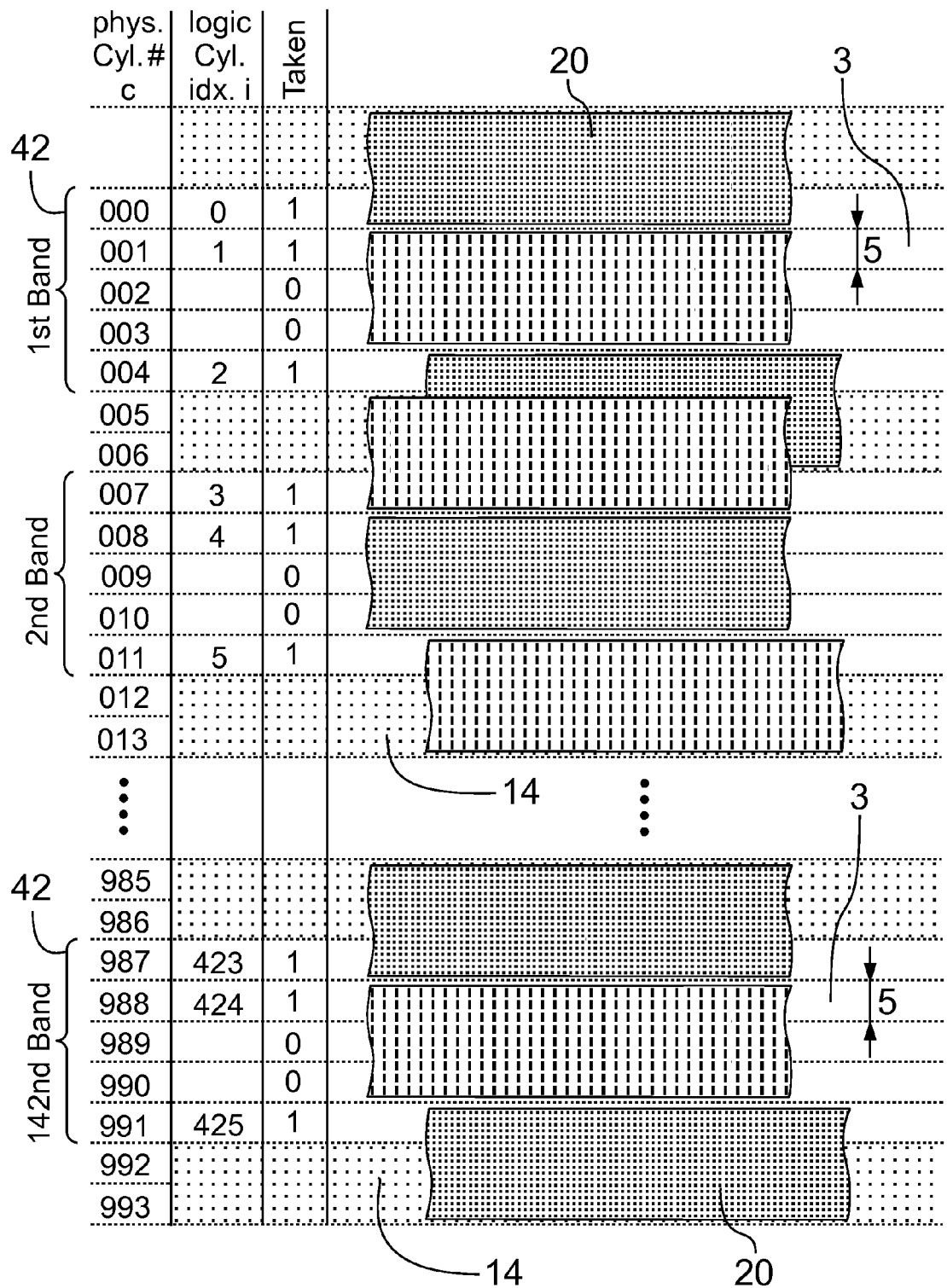
FIG. 22 shows the end of a "first phase," 60% of disk capacity is used. (seventh embodiment)
Figure 23:
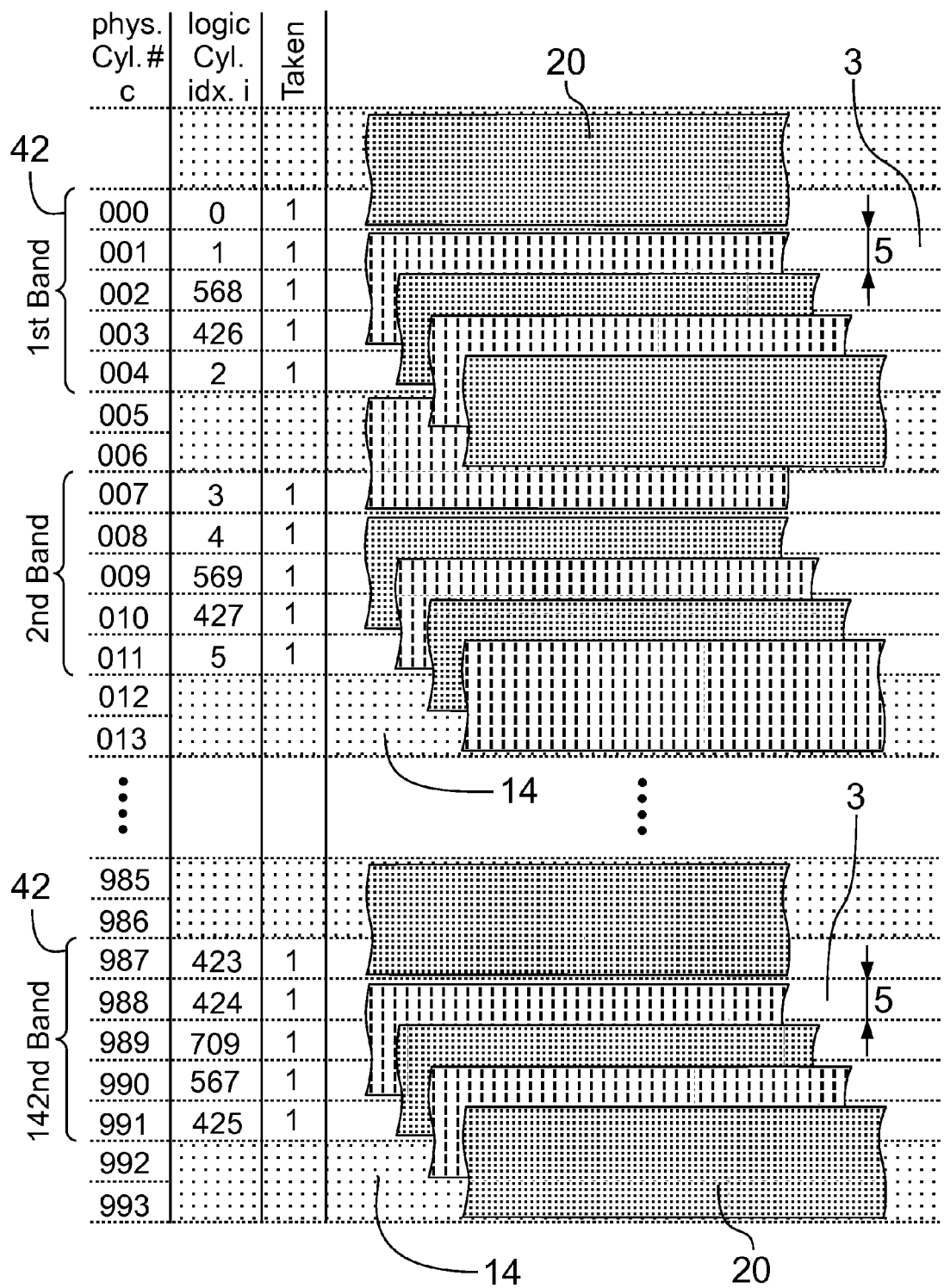
FIG. 23 shows the end of a "third phase," disk full. (seventh embodiment)

FIG. 22 and FIG. 23 show a seventh embodiment. In regard to the order or sequence in which the tracks 3 on a disk surface 2 are written, the seventh embodiment utilizes a strategy similar to that of the third embodiment, and thus, it may, inter alia, be suitable for files and/or databases whose contents change frequently.

The effective track width of the write element 16 is three times as wide as the track width 5 of the read element 17. The guard region 14 covers two tracks 3, i.e., a double track width 5. Five tracks 3 per band 23 may be used for storing data. A disk surface 2 contains 994 tracks, counted from cylinder #000 to cylinder #993, grouped into 142 bands. Address space "A" (LBAs from zero to A) is divided into three address subsets 23, with intervals of zero to 0.6 A, 0.6 A to 0.8 A, and 0.8 A to A. Filling an empty SMR hard disk drive 1 may be considered to take place in three "phases." The end of the "first phase" and the end of the final "third phase" are depicted in FIG. 22 and FIG. 23, respectively.

In contrast to the previous embodiments a mixed type of band is used, referred to herein as an asymmetrical band 42. An asymmetrical band 42 is characterized by aspects of a symmetrical band 22, whose guard regions 14 are located at the band boundaries, as per FIG. 6 and FIG. 11. However, in contrast to a symmetrical band 22, the overlapping data tracks 20 diverge at an off-center position so that the lower part of the band 23 is comparable to a conventional band 15. E.g., as shown in FIG. 22 and FIG. 23, the data tracks 20 of the 1st band diverge between cylinder #000 and cylinder #001. The overlapping data tracks 20 of cylinder #001 to cylinder #004 are comparable to a conventional band 15.

This approach makes it possible to assign the first address subset 23 to a dedicated selection of tracks 3 comprising three of five tracks 3 per band 23, such that the written data tracks 20 do not overlap, with the exception of the guard region 14.

That is, the excess width 18 of the write element 16 is caught by empty adjacent tracks 3 or by the guard region 14. Hence, no read-modify-write operations may be required when updating existing data, typically, up to a fill level of 60%. By way of example, at the end of the "first phase," as depicted in FIG. 22, data have been added to the tracks 3 on cylinders #000, #001, and #004 of the 1st band. This is indicated with value "1" in the "Taken" column.

FIG. 23 shows the tracks 3 of a full disk surface 2 at the end of the third and final "phase." The "second phase," which is not shown in the drawings, can be comprehended by means of the "logic Cyl. idx. i" column in FIG. 23. E.g., with respect to the 1st band, data are added to the track 3 on cylinder #003 in the "second phase," and subsequently, in the "third phase," data are added to the track 3 on cylinder #002. Write amplification may occur in the "second phase" and, especially, in the "third phase." The last 20% of storage capacity thus constitutes a reserve capacity.

Referring back to the first embodiment, address space "A" (LBAs from zero to A) is divided into two address subsets 23, as illustrated in FIG. 9. In keeping with the formula c=f(g(a)), a "change" from the "first phase" to the "second phase" may take place as soon as the fill level exceeds 50%, that is, as soon as at least one LBA number above 0.5 A is used.

Furthermore, as depicted in FIG. 9, a file management table 24 for a file system (e.g., "File Allocation Table", FAT) is located at the beginning of the address space, i.e., at low LBA numbers. Alternatively, the file management table 24 may represent any other type of directory, table contents, or index data that are often changed or updated during operation. Up to a fill level of 50%, that is, as long as LBA numbers from the first address subset 23 are used, all data, including the file management table 24, are stored on the outer tracks 3 of the bands 21. As a result, the file management table 24 may be updated without read-modify-write. However, in the "second phase," as soon as more than 50% of disk capacity is used, a write amplification may occur when updating the file management table 24. This is because the file management table 24 is located on the outer tracks 3 and valid data may already be located on the inner adjacent tracks 3, necessitating a read-modify-write.

Figures 24, 25:
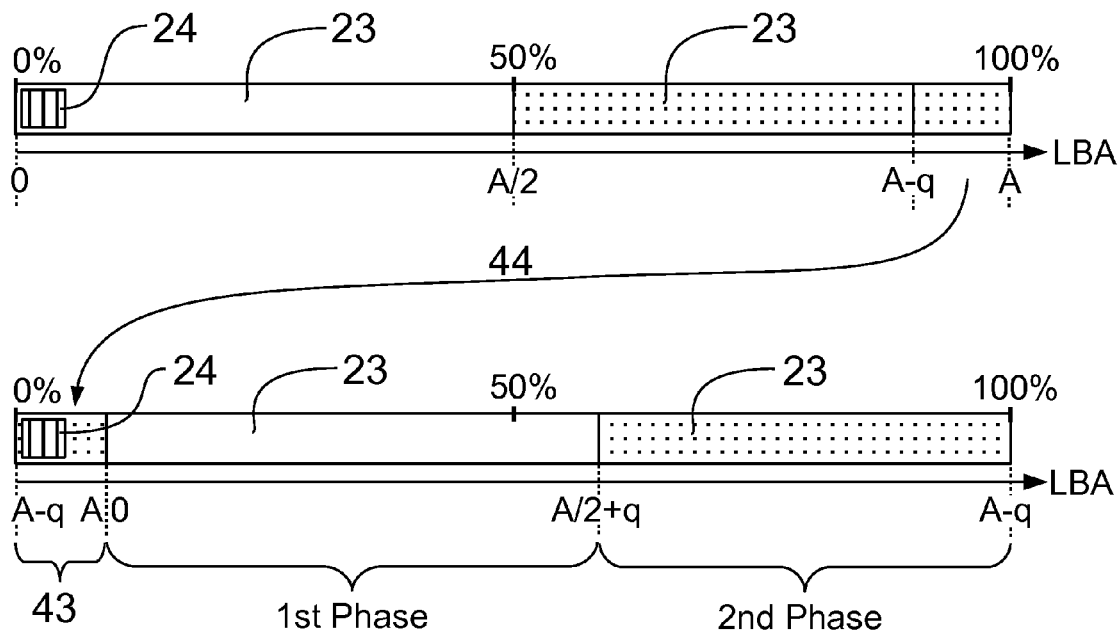
FIG. 24 illustrates a virtually shifted address subset to improve the performance of a file management table.
FIG. 25 shows a modified first embodiment; the data of a file management table is located close to the guard regions.

To avoid the aforementioned write amplification at any fill level when updating the file management table 24 (especially in the "second phase"), an optimized address subset 43 may be remapped virtually by means of the hard disk controller 10. This optional embodiment is illustrated in FIG. 24. The optimized address subset 43 has a size of "q" sectors 4, i.e., it encompasses "q" LBA numbers. The value of "q" may be selected such that the file management table 24 fully fits within the optimized address subset 43. The optimized address subset 43 may, however, also be larger or possibly smaller, e.g., if the exact size of the file management table 24 is unknown.

Remapping results in splitting the second address subset 23 into two parts. In accordance with FIG. 24, the optimized address subset 43 is assigned to high LBA numbers ranging from A-q to A that would otherwise be used at the end of the "second phase." The optimized address subset 43 is intended for the file management table 24, while the size of the remaining second address subset 23 is reduced by "q" sectors 4. Such remapping is expressed as function h(a), where "a" is an LBA number. This results in a new overall formula.

$$c=f(g(h(a)))$$

The optimized address subset 43 is shifted virtually to the beginning of the address space, as indicated by the arrow 44 in FIG. 24. This may ensure that the file management table 24 is stored on inner tracks 3 of the bands 21, which are otherwise only used in the latest stage, when the SMR hard disk drive 1 is mostly full. Since the tracks 3 assigned to the optimized address subset 43 are adjacent to the guard tracks 14, updating the file management table 24 is possible at any time without necessitating read-modify-write.

This is illustrated in FIG. 25, which shows an example of the last two bands 21 (198th band and 199th band) on the last disk surface 2 in the disk stack 13. Sector data belonging to the file management table 24 are located on the tracks 3 of cylinders #986, #988, #991, and #993. Since these tracks 3 are adjacent to the guard tracks 14, it is possible to overwrite the tracks 3 at any time, at any fill level, and in each "phase," without read-modify-write, and thus, changes can be made to the file management table 24 without write amplification.

A remapping of the file management table 24 is also possible in other embodiments through a suitable function h(a). For example, in the fourth embodiment, a file management table 24 may be stored on advantageous tracks 3 by splitting off the last portion of the fifth address subset 23 and remapping it to a LBA range encompassing substantially all logical block addresses of the file management table, constituting the optimized address subset 43.

The file management table 24 need not necessarily be located at the "beginning" of the hard disk, that is, at low LBA numbers, but can be located anywhere within address space "A", including the middle of address space "A", such as with a Master File Table (MFT) of the New Technology File System (NTFS).

Figure 26:
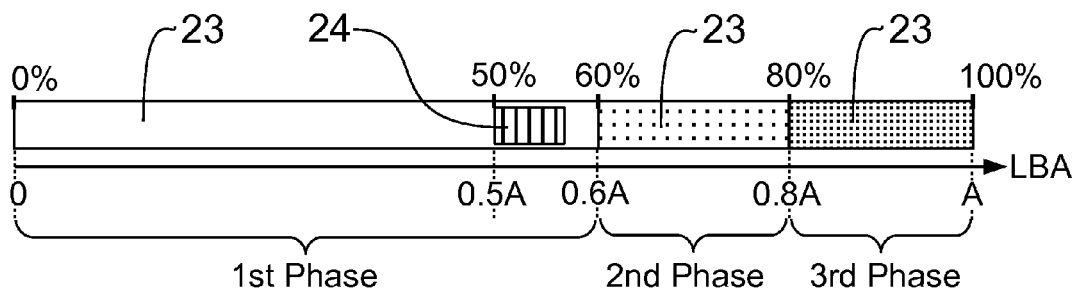
FIG. 26 illustrates the address subsets of the third embodiment.

FIG. 26 shows the three address subsets 23 and "phases" of the third embodiment. The "phases" are "switched" at 0.6 A (fill level: 60%) and 0.8 A (fill level: 80%), where "A" is the address space of the SMR hard disk drive 1. In this example, a file management table 24 is located in the middle of the address space, at 0.5 A. As the file management table 24 is located entirely within the first address subset 23, updating the file management table 24 may be possible without read-modify-write up to a fill level of 60%.

Figure 27:
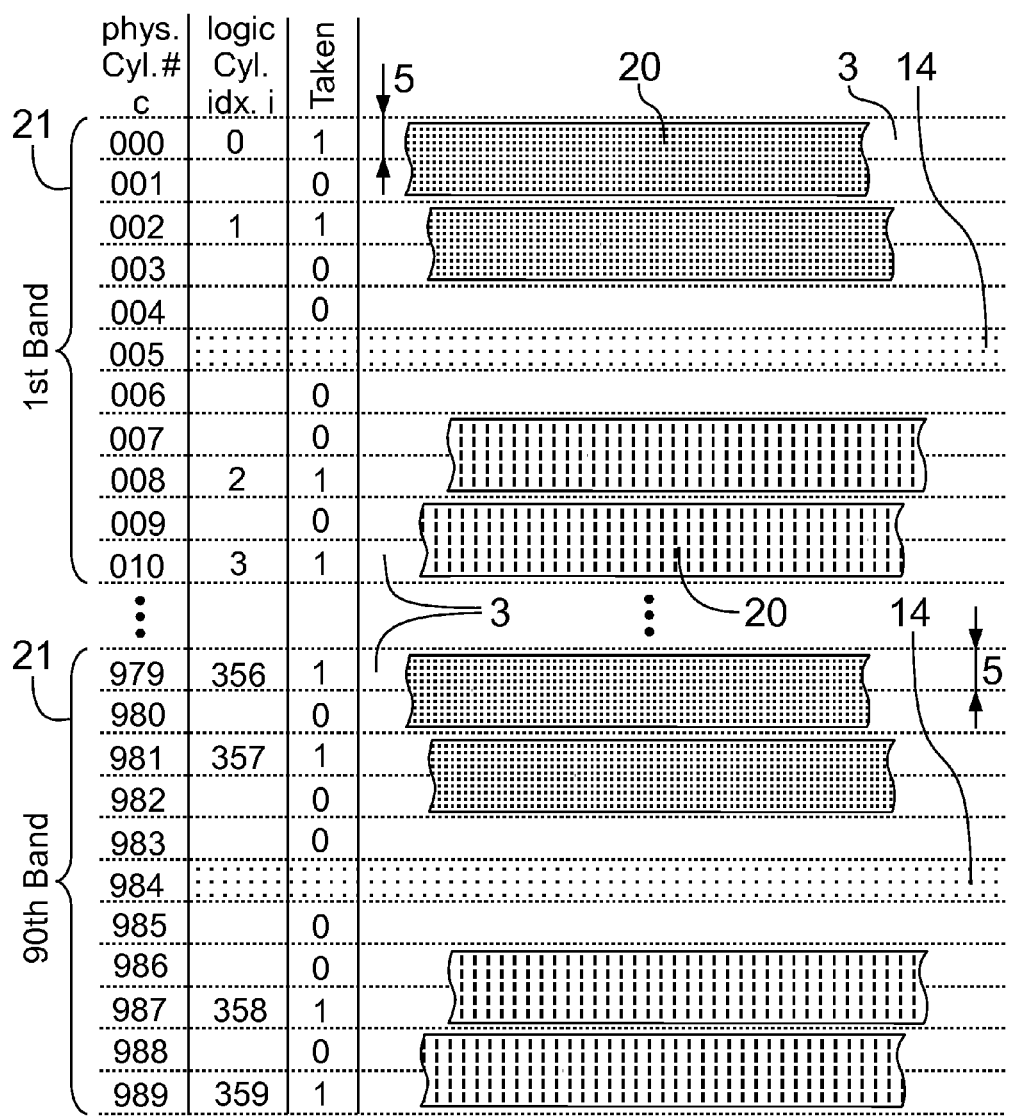
FIG. 27 shows a modified third embodiment at the end of a "first phase."
Figures 28, 29:
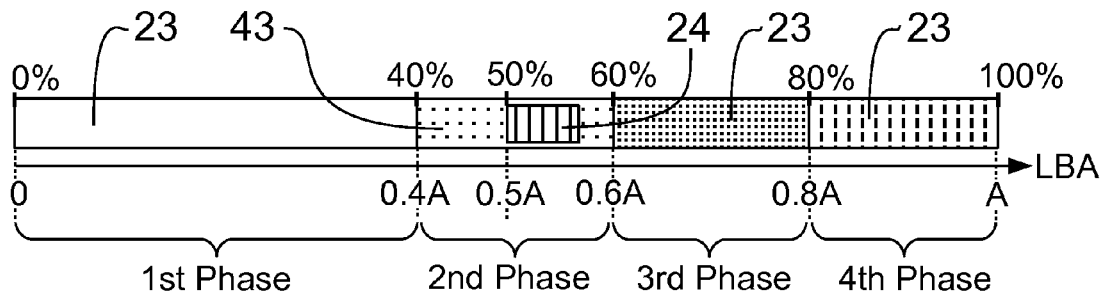
FIG. 28 illustrates an optimized address subset, which encompasses a file management table. (modified third embodiment)
FIG. 29 illustrates that the data of the file management table are stored on tracks close to the guard regions. (modified third embodiment)

Optionally, the third embodiment may be modified to avoid write amplification when updating the file management table 24 at a fill level above 60%. This is illustrated in FIG. 27 through FIG. 29. Instead of three address subsets 23, four address subsets 23, 43 are used. FIG. 27 shows the tracks 3 of the first address subset 23, which is responsible for a logical cylinder index of i=0 to i=359. In contrast to the original variety, this option uses a dedicated selection of only four tracks 3 per band 21. The two innermost tracks 3, adjacent to the guard track 14, are reserved for a new, optimized address subset 43, which is, inter alia, designated for the file management table 24. This is shown in FIG. 28: the file management table 24 is located in the optimized address subset 43 ("second phase") between 0.4 A and 0.6 A, which may comply with a fill level between 40% and 60%.

FIG. 29 shows the location of the tracks 3 designated for the file management table 24, for example, the tracks 3 on cylinder #004 and cylinder #006 in the 1st band. The written data tracks 20 do not overlap, with the exception of the guard regions 14. The corresponding optimized address subset 43 is responsible for a logical cylinder index of i=360 to i=539.

The "third phase" and the "fourth phase" (e.g., fill levels of 60% to 80% and 80% to 100%) correspond to the "second phase" and "third phase" of the original third embodiment as shown in FIG. 13 and FIG. 14. Data are added to the remaining empty tracks 3. Yet, changes can be made to the file management table 24 at any time and at any fill level without causing write amplification, since the file management table 24 is stored on tracks 3 adjacent to the guard tracks 14.

Those skilled in the art will recognize that there is a wide variety of ways and strategies in regard to the order or sequence in which the tracks 3 on the disk surfaces 2 can be written. Various embodiments may be combined and/or varied. Those skilled in the art will therefore choose a suitable embodiment or variant.

Furthermore, a configuration option may be provided so that users can select or change the strategy, order, or sequence in which tracks 3 are written. This could be done as part of a re-initialization that optimizes the SMR hard disk drive 1 for a specific, or new, purpose. The hard disk controller 10 may also change the strategy adaptively during operation, in order to respond to the characteristics of the written data. E.g., the hard disk controller 10 may determine the dominating task type, such as adding new data to free disk space or changing existing data.

In some disclosed embodiments, when filling a hard disk drive 1 with data, the read/write heads 8 switch to the next disk surface 2 not until data have been added to each band 15, 21, 22, 42 of the present disk surface 2. That is, data are written to a dedicated selection of tracks 3 encompassing all bands 15, 21, 22, 42 on a disk surface 2, and only then does a switch to the next disk surface 2 take place. However, in other embodiments the read/write heads 8 may switch between different disk surfaces 2 more frequently, for instance, after each zone. Examples may be found in U.S. Pat. No. 8,699,185 B1, entitled "Disk drive defining guard bands to support zone sequentially when butterfly writing shingled data tracks," the disclosure of which is hereby incorporated by reference in its entirety.

Optionally, one or more disk surfaces 2 of the hard disk drive 1 may be divided into areas with overlapping data tracks 20 and areas with conventional, non-overlapping tracks. The areas with conventional, non-overlapping tracks may be used as fast write caches. E.g., while the methods according to the present disclosure may be applied to larger areas with overlapping data tracks 20, conventional caching may be done in smaller areas with non-overlapping tracks. More information about combining overlapping and non-overlapping areas on a disk surface 2 may be found in patent application US2014/0006707 A1, entitled "ICC-NCQ Command Scheduling for Shingle-written Magnetic Recording (SMR) Drives," the disclosure of which is hereby incorporated by reference in its entirety.

As for the embodiments presented in this disclosure, the read/write heads 8 used have write elements 16 twice or three times as wide as their respective read elements 17. However, other embodiments may have different width ratios. Generally speaking, the track width of the write element 16 can be any value greater than the track width 5 of the read element 17.

Furthermore, in some embodiments, the width of a guard region 14 may be equal to the track width 5 or to multiples of the track width 5. Thus, guard regions 14 may fit precisely into the grid of tracks 3. However, in other embodiments, guard regions 14 with different widths may be implemented that are expressly not multiples of the track width 5, but which, for example, are 1.5 times or 2.5 times the width of a track 3. It is to be explicitly noted that the present disclosure is not limited to guard regions 14 consisting of one or two tracks 3. A guard region 14 may have any suitable width. Also, the width of a guard region 14 may be increased to enhance the reliability of stored data.

For illustrative purposes, and to keep the number of depicted tracks 3 and/or physical sectors 4 manageable, all bands 15, 21, 22, 42 or other sections of the disk surfaces 2 shown in the drawings of the present disclosure comprise relatively few tracks 3 and/or physical sectors 4. It is to be expressly noted that actual embodiments may have very large track counts and/or sector counts and that all disclosed methods and devices can be implemented with any number of tracks 3 and/or physical sectors 4.

Each disk surface 2 in the disk stack 13 need not necessarily contain the same number of tracks 3, that is, each disk surface 2 may have its own, individual track count. This shall also apply to the bands 15, 21, 22, 42. Each individual band 15, 21, 22, 42 on a disk surface 2 may comprise a different, e.g., optimized, number of tracks 3. Moreover, the number and/or selection of tracks 3 assigned to an address subset 23 need not necessarily be equal for each band 15, 21, 22, 42, that is, a different dedicated selection of tracks 3 may be chosen individually for the 1st, 2nd, 3rd, etc., band 15, 21, 22, 42 on a disk surface 2.

The embodiments disclosed herein describe the invention based on the example of an SMR hard disk drive 1. All embodiments and further embodiments can, however, also be implemented by means of other data carrier media, which work, by way of example, on magnetic or optical bases. Also, recording data on a data carrier media may be combined with or assisted by other known technologies, such as "Heat-Assisted Magnetic Recording" (HAMR), "Two-Dimensional Magnetic Recording" (TDMR), and/or "Bit Patterned Media" (BPM).

Although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

What is claimed is:

1. A method for storing data on at least one data carrier surface of a storage device configured for overlapping data tracks, comprising:
    a) establishing a substantially immutable relation between a plurality of logical block addresses and physical locations on a plurality of tracks, said tracks being grouped into a plurality of bands,
    b) dividing the address space of said logical block addresses into at least two address subsets,
    c) assigning each address subset permanently to a dedicated selection of tracks of each band, said dedicated selection of tracks comprising substantially at least one track per band and encompassing all bands of said plurality of bands.

2. The method of claim 1, wherein an address subset is permanently assigned to a dedicated selection of tracks that are far enough apart so that, when overwriting a track from said dedicated selection, none of the other tracks from said dedicated selection are deleted by the data track of a write element with an excess width.

3. The method of claim 1, wherein an address subset is permanently assigned to a dedicated selection of tracks comprising substantially all tracks adjacent to guard regions, such that the excess width of a write element is caught by said guard regions.

4. The method of claim 1, further comprising at least one band whose associated guard region is located in the middle or near the middle of said band, both tracks adjacent to said guard region being written such that the excess width of a write element is caught by said guard region from both sides.

5. The method of claim 4, wherein overlapping data tracks, written by said write element, converge from both outer boundaries of said band inward, toward said guard region, establishing overlaps in opposite radial directions within said band.

6. The method of claim 5, further comprising:
    a) assigning a first address subset permanently to a dedicated selection of tracks comprising the two outermost tracks on both sides of each band,
    b) assigning a second address subset permanently to a dedicated selection of tracks comprising the next inwardly adjacent tracks on both sides of each band,
    c) writing data to substantially all tracks of said first address subset, essentially in a first phase,
    d) writing data to substantially all tracks of said second address subset, essentially in a second phase.

7. The method of claim 1, further comprising at least two adjacent bands whose shared guard region is located at the common boundary of said bands, the tracks adjacent to said common boundary being written such that the excess width of a write element is caught by said shared guard region from both sides.

8. The method of claim 7, wherein overlapping data tracks, written by said write element, diverge from a location in the middle or near the middle of each band outward, toward said shared guard regions, establishing overlaps in opposite radial directions within said bands.

9. The method of claim 8, further comprising:
    a) assigning a first address subset permanently to a dedicated selection of tracks comprising two adjacent tracks from said location in the middle or near the middle of each band,
    b) assigning a second address subset permanently to a dedicated selection of tracks comprising the next outwardly adjacent tracks on both sides of each band,
    c) writing data to substantially all tracks of said first address subset, essentially in a first phase,
    d) writing data to substantially all tracks of said second address subset, essentially in a second phase.

10. The method of claim 1, further comprising:
    a) assigning a first address subset permanently to a dedicated selection of tracks comprising the first track of each band,
    b) assigning a second address subset permanently to a dedicated selection of tracks comprising the second track of each band,
    c) writing data to substantially all tracks of said first address subset, essentially in a first phase,
    d) writing data to substantially all tracks of said second address subset, essentially in a second phase.

11. The method of claim 1, further comprising a plurality of data carrier surfaces, wherein a first address subset is permanently assigned to a dedicated selection of tracks encompassing tracks from each data carrier surface of said plurality of data carrier surfaces, said storage device being filled with data, wherein essentially in a first phase data are written to all data carrier surfaces by means of said first address subset, and wherein data are written to remaining empty tracks on all data carrier surfaces essentially in at least one subsequent phase.

12. The method of claim 1, further comprising an optimized address subset whose range of logical block addresses encompass substantially all logical block addresses of a file management table, directory, or region for index data, said optimized address subset being permanently assigned to a dedicated selection of tracks comprising tracks adjacent to guard regions, such that the excess width of a write element is caught by said guard regions.

13. The method of claim 1, wherein:
a) said storage device is a hard disk drive that operates according to the shingled magnetic recording methodology,
b) said data carrier surface is a disk surface of said hard disk drive,
c) said overlapping data tracks are grouped into bands and are separated by guard regions in accordance with the shingled magnetic recording methodology,
d) said physical locations on said tracks are physical sectors.

14. A storage device configured for overlapping data tracks, comprising:
a) at least one data carrier surface,
b) a plurality of tracks at least on said data carrier surface, said plurality of tracks being grouped into a plurality of bands,
c) at least one write element whose data track width exceeds the track width of a read element by an excess width,
d) a control unit configured to establish a substantially immutable relation between a plurality of logical block addresses and physical locations on said plurality of tracks, wherein the address space of said logical block addresses is divided into at least two address subsets, and wherein each address subset is permanently assigned to a dedicated selection of tracks of each band, said dedicated selection of tracks comprising substantially at least one track per band and encompassing all bands of said plurality of bands.

15. The storage device of claim 14, wherein an address subset is permanently assigned to a dedicated selection of tracks that are far enough apart so that, when overwriting a track from said dedicated selection, none of the other tracks from said dedicated selection are deleted by said excess width of said write element.

16. The storage device of claim 14, wherein an address subset is permanently assigned to a dedicated selection of tracks comprising substantially all tracks adjacent to guard regions, such that said excess width of said write element is caught by said guard regions.

17. The storage device of claim 14, further comprising at least one band whose associated guard region is located in the middle or near the middle of said band, both tracks adjacent to said guard region being written such that said excess width of said write element is caught by said guard region from both sides.

18. The storage device of claim 14, further comprising at least two adjacent bands whose shared guard region is located at the common boundary of said bands, the tracks adjacent to said common boundary being written such that said excess width of said write element is caught by said shared guard region from both sides.

19. The storage device of claim 14, wherein each band comprises overlapping data tracks with overlaps in opposite radial directions between the middle or near the middle of each band and the band boundaries.

20. The storage device of claim 14, further comprising a plurality of data carrier surfaces, wherein a first address subset is permanently assigned to a dedicated selection of tracks encompassing tracks from each data carrier surface of said plurality of data carrier surfaces.

21. A hard disk controller configured for overlapping data tracks, comprising control circuitry operable to establish a substantially immutable relation between a plurality of logical block addresses and physical locations on a plurality of tracks, said tracks being grouped into a plurality of bands, wherein the address space of said logical block addresses is divided into at least two address subsets, and wherein each address subset is permanently assigned to a dedicated selection of tracks of each band, said dedicated selection of tracks comprising substantially at least one track per band and encompassing all bands of said plurality of bands.

* * * * *